United States Patent
Park et al.

(10) Patent No.: US 8,624,823 B2
(45) Date of Patent: Jan. 7, 2014

(54) LIGHT SOURCE ASSEMBLY, LIQUID CRYSTAL DISPLAY, AND METHOD OF DRIVING LIGHT SOURCE ASSEMBLY

(75) Inventors: Se-Ki Park, Suwon-si (KR); Gi-Cherl Kim, Yongin-si (KR); Sang-Il Park, Seoul (KR); Jung-Hyeon Kim, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 845 days.

(21) Appl. No.: 12/274,738

(22) Filed: Nov. 20, 2008

(65) Prior Publication Data

US 2009/0140972 A1   Jun. 4, 2009

(30) Foreign Application Priority Data

Dec. 4, 2007   (KR) .......................... 10-2007-0125040

(51) Int. Cl.
*G09G 3/36* (2006.01)

(52) U.S. Cl.
USPC ........................................................ 345/102

(58) Field of Classification Search
USPC ........................................................ 345/102
See application file for complete search history.

(56) References Cited

U.S. PATENT DOCUMENTS

| 2006/0066265 A1 | 3/2006 | Plotz et al. | |
| 2006/0104058 A1* | 5/2006 | Chemel et al. | 362/231 |
| 2007/0001587 A1* | 1/2007 | Hatwar et al. | 313/504 |
| 2007/0268695 A1* | 11/2007 | Seetzen | 362/231 |

FOREIGN PATENT DOCUMENTS

| JP | 2004029141 A | 1/2004 |
| JP | 2004078102 | 3/2004 |
| JP | 2006276784 A | 10/2006 |
| JP | 2007080998 A | 3/2007 |
| JP | 2007101669 A | 4/2007 |
| WO | 2007026885 A1 | 3/2007 |

OTHER PUBLICATIONS

European Search Report for application No. 08020367.2-2205 dated Jun. 4, 2009.

* cited by examiner

*Primary Examiner* — Quan-Zhen Wang
*Assistant Examiner* — Nelson D Runkle, III
(74) *Attorney, Agent, or Firm* — Cantor Colburn LLP

(57) ABSTRACT

A light source assembly includes a light source which emits light; a detector which detects the light and generates a light signal based on a property of the light; an operator operably connected to the detector and which receives the light signal and calculates a color coordinate of the light source based on the light signal; a comparator operably connected to the operator and which compares the color coordinate of the light source to a predetermined reference color coordinate; and a control unit operably connected to the comparator and which controls a pulse width modulation signal transmitted to the light source based on a result of the comparison of the comparator.

22 Claims, 19 Drawing Sheets

LIGHT SOURCE ASSEMBLY, LIQUID CRYSTAL DISPLAY, AND METHOD OF DRIVING LIGHT SOURCE ASSEMBLY

This application claims priority to Korean Patent Application No. 10-2007-0125040, filed on Dec. 4, 2007, and all the benefits accruing therefrom under 35 U.S.C. §119, the contents of which in its entirety are herein incorporated by reference.

BACKGROUND OF THE INVENTION

1. Field of the Invention

The present invention relates to a light source assembly, a liquid crystal display ("LCD") having the light source assembly, and a method of driving the light source assembly, and more particularly, to a light source assembly, an LCD having the light source assembly, and a method of driving the light source assembly, in which a reproducible color space is expanded to represent colors which more accurately represent natural colors.

2. Description of the Related Art

As society becomes more dependent on sophisticated information and communication technology, market needs for larger and thinner displays increase. In particular, conventional cathode ray tubes ("CRTs") fail to fully satisfy the market needs, and demand for flat panel displays ("FPDs") such as plasma display panels ("PDPs"), plasma address liquid crystal ("PALC") display panels, liquid crystal displays ("LCDs"), and organic light emitting diodes ("OLEDs"), for example, is therefore rapidly increasing.

Generally, standard monitors set a color space of a standard red, green and blue ("sRGB") standard as a standard color space for the standard monitor. However, only a limited number of colors can be represented in the color space of the sRGB standard. Thus, standard monitors which set the sRGB standard cannot represent colors outside a range of colors of the sRGB color space. In addition, devices such as digital cameras, for example, have recently been improved such that they capture colors outside the range of colors of the sRGB color space. However, if an image captured by such a digital camera, for example, is displayed on a standard monitor which utilizes the sRGB standard, colors captured by the digital camera cannot be accurately represented. Thus, a monitor having a color space including a wider range of colors than the sRGB color space, such as an ADOBE® RGB color space, is required.

BRIEF SUMMARY OF THE INVENTION

A liquid crystal display ("LCD") according to an exemplary embodiment which includes a wide color gamut wherein both a color filter and a light source represent a color space.

The LCD according to an exemplary embodiment further includes real time corrections of the properties of the light source or the color filter. As a result, the LCD, including a light source assembly, includes a reproducible color space and represents colors more accurately to those which exist in nature.

A light source assembly according to an exemplary embodiment of the present invention includes a light source which emits light; a detector which detects the light and generates a light signal based on a property of the light source; an operator operably connected to the detector and which receives the light signal and calculates a color coordinate of the light source based on the light signal; a comparator operably connected to the operator and which compares the color coordinate of the light source to a predetermined reference color coordinate; and a control unit operably connected to the comparator and which controls a pulse width modulation ("PWM") signal transmitted to the light source based on a result of the comparison of the comparator.

According to alternative exemplary embodiment of the present invention, an LCD includes a color filter and a light source assembly disposed on the color filter. The color filter includes a red filter, a green filter and a blue filter. The light source assembly includes: a red light source which emits red light having a wavelength with a main peak in a range of approximately 620 nm to approximately 630 nm and a spectrum having a full width at half maximum of less than approximately 15 nm; a green light source which emits green light having a wavelength with a main peak in a range of approximately 525 nm to approximately 535 nm and a spectrum with a full width at half maximum of less than approximately 30 nm; and a blue light source which emits blue light having a wavelength with a main peak in a range of approximately 445 nm to approximately 455 nm and a spectrum with a full width at half maximum of less than approximately 19 nm. The light source assembly mixes the red light, the green light and the blue light to generate white light and outputs the white light to the color filter.

According to another alternative exemplary embodiment of the present invention, a method of driving a light source assembly includes detecting light emitted from a light sources with a detector and generating a light signal based on a property of the light with the detector, receiving the light signal with an operator and calculating a color coordinates of the light sources with the operator, comparing the color coordinates of the light sources to a predetermined reference color coordinates using a comparator, and controlling a pulse width modulation PWM signal transmitted to the light sources with a controller based on the comparison result.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
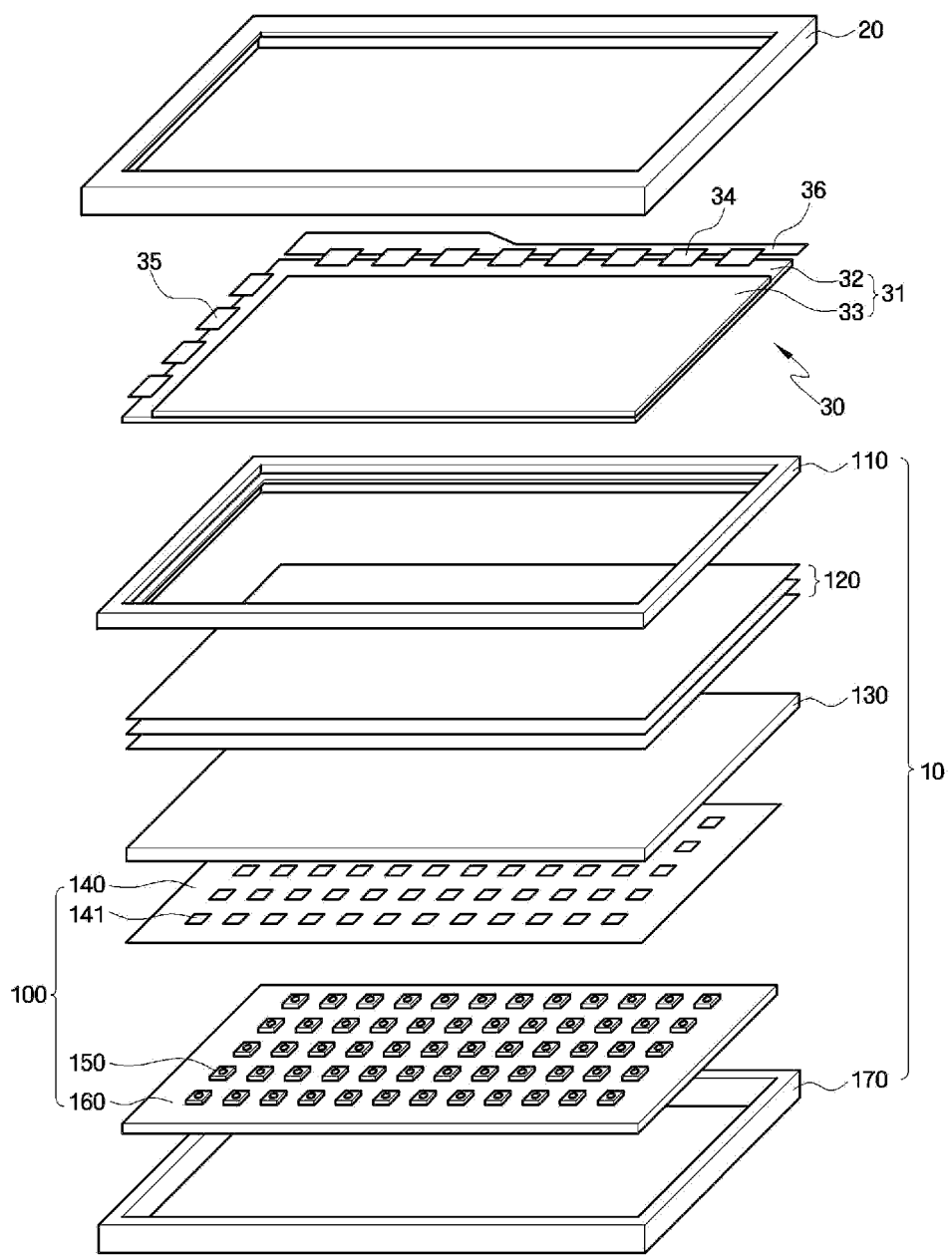
FIG. 1 is an exploded perspective view of a liquid crystal display ("LCD") according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Figure 2:
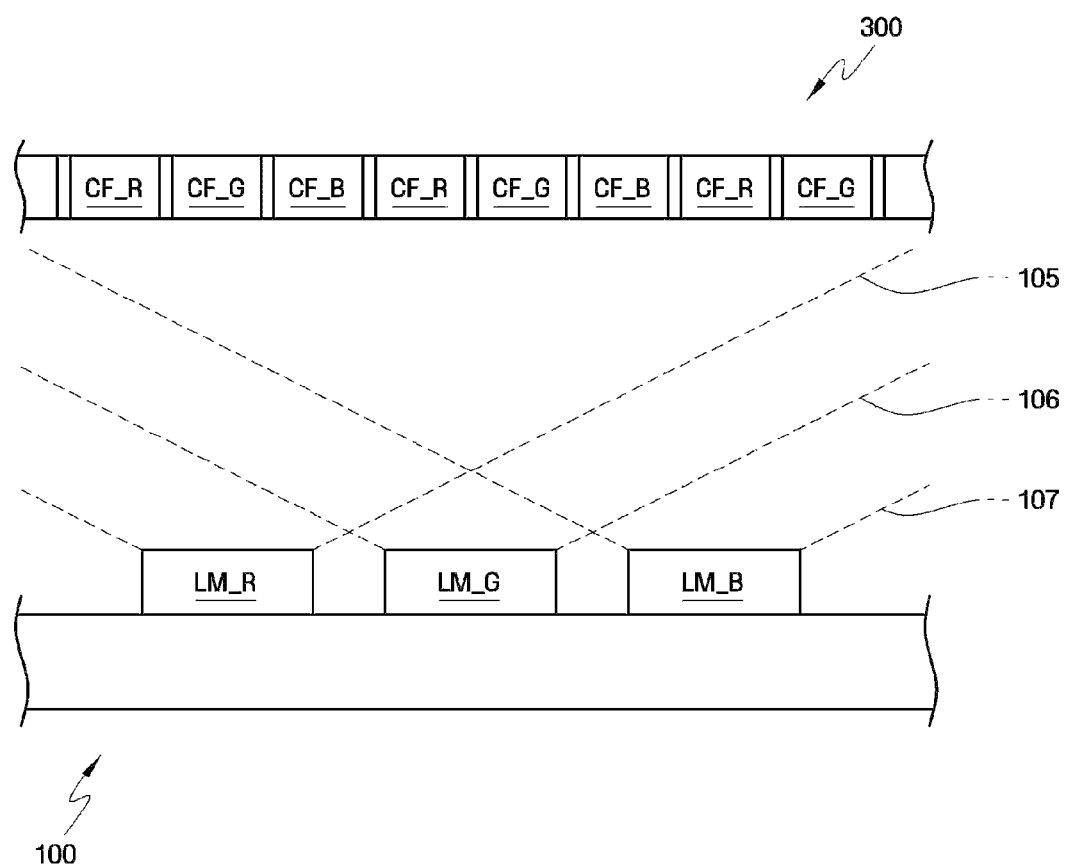
FIG. 2 is a partial cross-sectional view illustrating a color filter and a light source assembly included in the LCD according to the exemplary embodiment of the present invention shown in FIG. 1.

Hereinafter, a liquid crystal display ("LCD") according to an exemplary embodiment of the present invention will be described in further detail with reference to the accompanying drawings. FIG. 1 is an exploded perspective view of an LCD 1 according to an exemplary embodiment of the present invention. FIG. 2 is a partial cross-sectional view illustrating a color filter and a light source assembly 100 included in the LCD 1 according to the exemplary embodiment of the present invention shown in FIG. 1.

Referring to FIG. 1, the LCD 1 according to the present embodiment includes a liquid crystal panel assembly 30, an upper case 20, and a backlight assembly 10.

The liquid crystal panel assembly 30 includes a liquid crystal panel 31, which includes a thin-film transistor ("TFT") display substrate 32, a common electrode display substrate 33, and a liquid crystal layer (not shown) interposed between the TFT display substrate 32 and the common electrode display substrate 33. The liquid crystal panel assembly 30 further includes a gate chip film package 35, a data chip film package 34, and an integrated printed circuit board ("PCB") 36.

The liquid crystal panel 31 includes the TFT display substrate 32 and the common electrode display substrate 33. The TFT display substrate 32 further includes gate lines (not shown), data lines (not shown), a TFT array (not shown), and pixel electrodes (not shown). The common electrode display substrate 33 includes a black matrix (not shown) and common electrodes (not shown), and is disposed to substantially face the TFT display substrate 32, as shown in FIG. 1. In operation, the liquid crystal panel 31 displays an image.

The gate chip film package 35 is connected to each gate line (not shown) formed on the TFT display substrate 32 under the common electrode display substrate 33. The data chip film package 34 is connected to each data line (not shown) formed on the TFT display substrate 32. The gate chip film package 35 and the data chip film package 34 each include a wiring pattern (not shown), in which semiconductor chips (not shown) are formed on a base film(not shown), and a tape automated bonding ("TAB") tape (not shown) which is bonded with the semiconductor chips by TAB technology, for example, but alternative exemplary embodiments are not limited thereto. In an exemplary embodiment, the gate chip film package 35 and the data chip film package 34 may each include a tape carrier package ("TCP") or a chip on film ("COF"), for example, but alterative exemplary embodiments are not limited thereto.

Driving parts (not shown) are mounted on the integrated PCB 36 to transmit a gate-driving signal to the gate chip film package 35 and a data-driving signal to the data chip film package 34.

The upper case 20 forms an exterior component of the LCD 1 which includes a space wherein the liquid crystal panel assembly 30 is accommodated. An opening, e.g. a window is formed proximate to a center of the upper case 20 to expose the liquid crystal panel 31, as shown in FIG. 1.

An intermediate frame 110 interposed between the upper case 20 and a lower case 170 couples the upper case 20 to the lower case 170.

Still referring to FIG. 1, the backlight assembly 10 includes the intermediate frame 110, at least one optical sheet 120, a diffuser plate 130, the light source assembly 100, and the lower case 170.

The intermediate frame 110 is securely fixed to the lower case 170 and contains the optical sheet 120, the diffuser plate 130, and the light source assembly 100 In an exemplary embodiment, the intermediate frame 110 is substantially rectilinear and includes sidewalls formed along peripheral edges thereof. An opening, e.g., a window, is formed proximate to a center of the intermediate frame 110 to allow light which passes through the diffuser plate 130 and the optical sheet 120 to pass through the intermediate frame 110.

The optical sheet 120 collects and diffuses light received from the diffuser plate 130. Thus, optical sheet 120 is disposed on the diffuser plate 130 and is contained by the intermediate frame 110. In an exemplary embodiment, the optical sheet 120 includes a first prism sheet (not shown), a second prism sheet (not shown) and a protective sheet (not shown).

The first prism sheet and the second prism sheet refract light, e.g., light which is received at a low angle relative to a front side of the LCD 1, which passes through the diffuser plate 130, thereby concentrating the light received at the low angle onto the front side of the LCD 1 to improve a brightness of the LCD 1.

The protective sheet formed on the first prism sheet and the second prism sheet protects surfaces of the first prism sheet and the second prism sheet and diffuses light for uniform distribution of the light. A configuration of the optical sheet 120 in an alternative exemplary embodiment is not limited to the configuration described above.

The diffuser plate 130 receives light from a light source unit 150 and diffuses the received light in all directions. The diffuser plate 130 prevents bright defects, e.g., bright points such as point light sources having a shape of, and being produced by, individual light source units 150 of a plurality of the light source units 150, from being visible on a front surface of the LCD 1.

The light source assembly 100 is a light-emitting device which supplies light to the diffuser plate 130. The light source assembly 100 includes the light source units 150, a circuit board 160, and a reflective sheet 140. In an exemplary embodiment, each of the light source units 150 emits white light and is connected to the circuit board 160 to receive a driving voltage. The light sources 150 are disposed on the circuit board 160, and a reflective sheet 140 is disposed on the circuit board 160 to fix a position of each of the light source units 150 on the circuit board 160.

The reflective sheet 140 includes openings 141 which receive respective light source units 150, e.g., expose the respective light source units 150 through the reflective sheet 140, such that the reflective sheet 140 thereby allows light from the light source units 150 to travel in an upward direction (as viewed in FIG. 1) and by reflecting light therefrom in the upward direction.

Structures of a color filter 300 and the light source assembly 100 according to an exemplary embodiment will now be described in further detail with reference to FIG. 2.

Referring to FIG. 2, light generated by the light source assembly 100 is selectively passed through the color filter 300 to display an image. The color filter 300 includes a red filter CF_R, a green filter CF_G, and a blue filter CF_B which correspond to each pixel (not shown). More specifically, each pixel is divided into a plurality of domains, and red light 105, green light 106, and blue light 107 are selectively passed through respective domains. The red filter CF_R, the green filter CF_G, and the blue filter CF_B of the color filter 300 may be sequentially and repeatedly arranged in a line using a stripe arrangement method, for example, but alternative exemplary embodiments are not limited thereto. They may also be arranged using other arrangement methods, such as a delta arrangement method and a mosaic arrangement method, for example.

The light source assembly 100 generates light and provides the generated light to the liquid crystal panel 30 (see FIG. 1). In an exemplary embodiment, the light assembly 100 mixes red light, green light, and blue light to generate white light, and the light assembly 100 according to an exemplary embodiment therefore includes a red light source chip LM_R, a green light source chip LM_G, and a blue light source chip LM_B.

The red light source chip LM_R, the green light source chip LM_G, and the blue light source chip LM_B emit the red light 105, green light 106, and blue light 107, respectively. The red light 105, the green light 106, and the blue light 107 are mixed to produce white light incident to the color filter 300. In an exemplary embodiment, the red light source chip LM_R, the green light source chip LM_G, and the blue light source chip LM_B may be light-emitting diodes, white light-emitting diodes, fluorescent lamps, or laser light sources, for example, but alternative exemplary embodiments are not limited thereto.

The red filter CF_R, the green filter CF_G, and the blue filter CF_B each passes only a light having a respective predetermined wavelength. Specifically, the red filter CF_R passes light which corresponds to a red wavelength from the incident white light. Likewise, the green filter CF_G passes light which corresponds to a green wavelength from the incident white light, and the blue filter CF_B passes light which corresponds to a blue wavelength from the incident white light. As a result, light which passes through the red filter CF_R, light which passes through the green filter CF_G, and light which passes through the blue filter CF_B are mixed at an appropriate ratio thereof to represent a desired color image.

Light emitted from the light source assembly 100 may contain wavelengths other than those which correspond to the red light 105, the green light 106, and the blue light 107. In addition, depending on a luminance of an image to be displayed on the liquid crystal panel 30, the color filter 300 may pass a wider range of wavelengths than the respective wavelength of light of each color. Therefore, a purity of each of the red light 105, the green light 106, and the blue light 107 may be reduced, thereby affecting a color space which can be displayed on the liquid crystal panel 30. Changes in the color space of the LCD 1 according to a relationship between light generated by the light source assembly 100 and the color filter 300 will be described in further detail below.

Properties of the color filter 300 and the light source units 150 will now be described in further detail with reference to FIGS. 3 through 12B.

Figure 3:
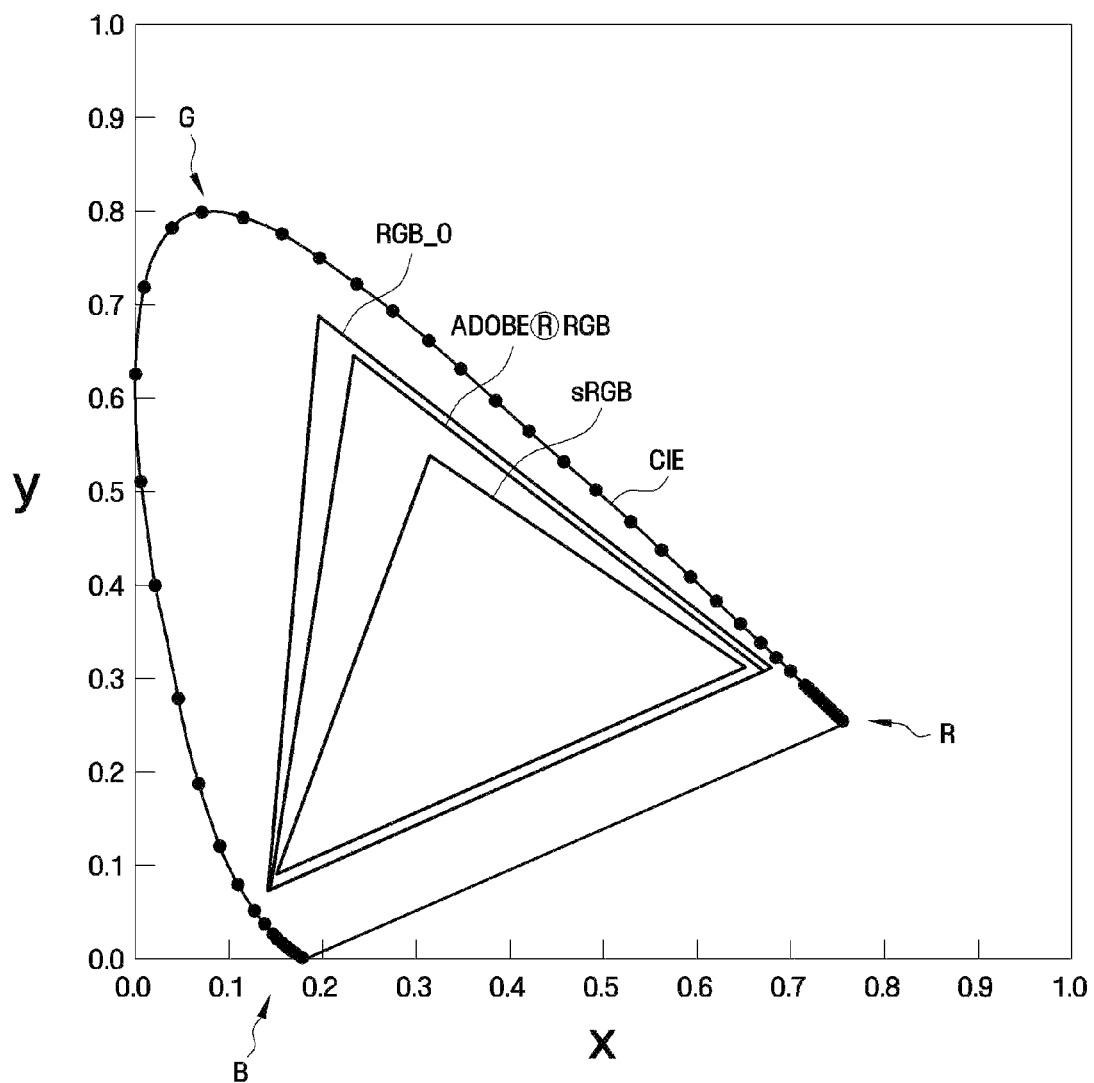
FIG. 3 is an x-y chromaticity diagram showing a color gamut of the LCD according to the exemplary embodiment of the present invention shown in FIG. 1.

FIG. 3 is an x-y chromaticity diagram showing a color gamut of the LCD 1 according to the exemplary embodiment of the present invention shown in FIG. 1. Referring to FIG. 3, the x-y chromaticity diagram of an XYZ color system standardized by the Commission International de l'eclairage ("CIE") includes a color gamut, e.g., subset, of a color space of the LCD 1 of FIG. 1, a color gamut of a standard red, green, and blue ("sRGB") color space, and a color gamut of an ADOBE® RGB color space.

Specifically, a CIE color space is a color space defined by the CIE and represents all natural colors. The sRGB color space is a standard jointly suggested by HEWLETT-PACKARD® and MICROSOFT® and is mainly used in display devices, such as monitors. The ADOBE® RGB color space is a color space standard suggested by ADOBE SYSTEMS INCORPORATED® and represents a wider range of colors relative to the sRGB color space. An RGB_0 color space is a gamut of colors which are reproduced by the LCD 1 according to an exemplary embodiment of the present invention.

Further, the RGB_0 color space includes both the sRGB color space and the ADOBE® RGB color space, as shown in FIG. 3. Thus, the RGB_0 color space represents a wider range of colors than both the sRGB color space and the ADOBE® RGB color space. In FIG. 3, each vertex of a respective color space, e.g., the sRGB color space, the ADOBE® color space, and the RGB_0 color space, indicates red, green and blue. For example, a first vertex of the RGB_0 color space represents red R, a second vertex of the RGB_0 color space represents green G, and a third vertex of the RGB_0 color space represents blue B, as shown in FIG. 3.

Figure 4:
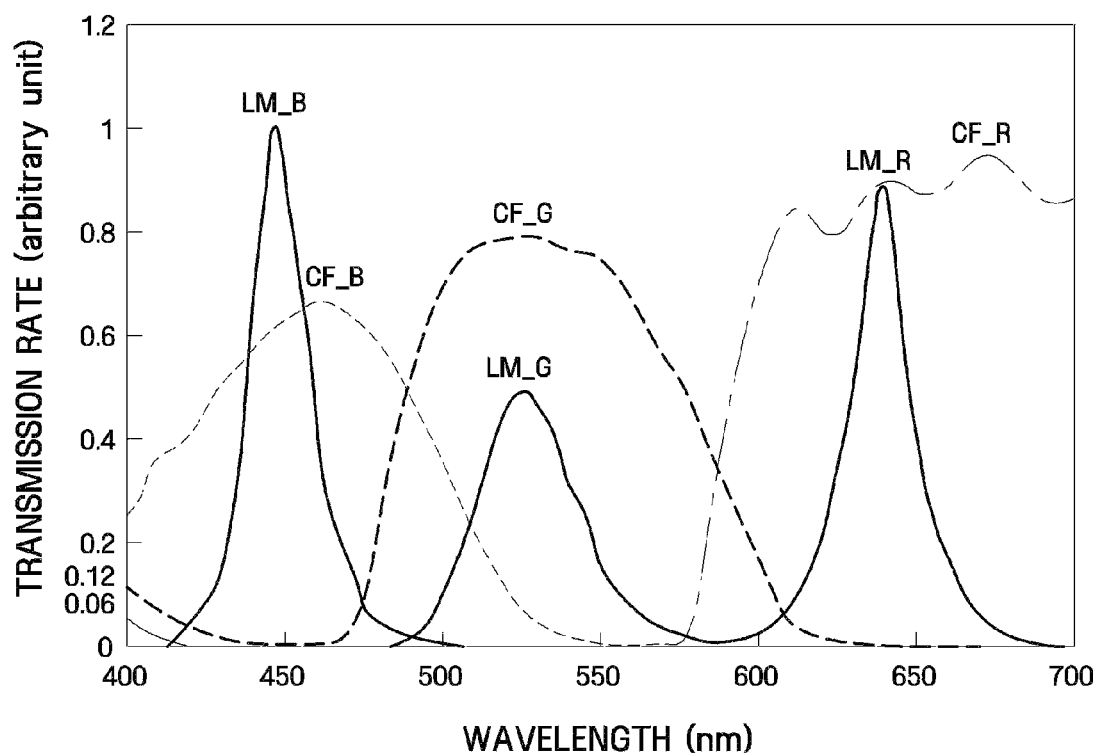
FIG. 4 is a graph of wavelength versus transmission rate illustrating spectral characteristics of the color filter and each light source chip included in the LCD according to the exemplary embodiment of the present invention shown in FIGS. 1 and 2.

The color filter 300, the red light source chip LM_R, the green light source chip LM_G, and the blue light source chip LM_B according to an exemplary embodiment will now be described in further detail with reference to FIG. 4. FIG. 4 is a graph of wavelength versus transmission rate illustrating spectral characteristics of the color filter 300 and the red light source chip LM_R, the green light source chip LM_G, and the blue light source chip LM_B included in the LCD 1 according to the exemplary embodiment of the present invention shown in FIG. 1.

Referring to FIG. 4, broken lines indicate respective transmission curves of the red filter CF_R, the green filter CF_G, and the blue filter CF_B, as labeled in FIG. 4. In addition, solid lines indicate respective spectral curves of the red light source chip LM_R, the green light source chip LM_G, and the blue light source chip LM_B, as labeled in FIG. 4.

As shown in FIG. 4, transmission wavelength ranges, e.g., widths of the respective transmission curves, of the red filter CF_R, the green filter CF_G, and the blue filter CF_B are greater, e.g., wider, than transmission wavelength ranges, e.g., widths of the spectral curves of the red light source chip LM_R, the green light source chip LM_G, and the blue light source chip LM_B, respectively. When a transmission wavelength range of the color filter 300 is reduced, for example, a luminance is reduced while a purity of color is enhanced. Therefore, the transmission wavelength range of the color filter 300 according to an exemplary embodiment is greater, e.g., wider, than a transmission wavelength range of the light source unit 150.

In addition, the transmission wavelength ranges of the red filter CF_R, the green filter CF_G and the blue filter CF_B may partially overlap one another, as shown in FIG. 4. Thus, light in a green-light region, for example, may pass through the red filter CF_R and the blue filter CF_B, and light in a red light region and light in a blue light region may pass through the green filter CF_G. When light in a region passes through an adjacent region of the color filter 300, purity of the associated color is reduced, which thereby reduces the color gamut of the LCD 1. Thus, in an exemplary embodiment, transmission characteristics of the color filter 300 and the spectral characteristics of the light source unit 150 are adjusted to maintain luminance of light at an appropriate level and, at the same time, represent a wide range of colors.

Each of the light source units 150 (see FIG. 1) according to an exemplary embodiment includes the red light source chip LM_R, the green light source chip LM_G, and the blue light source chip LM_B (see FIG. 2). The red light source chip LM_R emits red light which has a wavelength with a main peak of approximately 620 nm to approximately 630 nm and a spectrum having a full width at half maximum ("FWHM") of less than approximately 15 nm. The green light source chip LM_G emits green light which has a wavelength with a main peak of approximately 525 nm to approximately 535 nm and a spectrum having an FWHM of less than approximately 30 nm. The blue light source chip LM_B emits blue light which has a wavelength with a main peak of approximately 445 nm to approximately 455 nm and a spectrum having an FWHM of less than approximately 19 nm.

The transmission spectrum of the green filter CF_G of the color filter 300 has a wavelength with a main peak of approximately 515 nm to approximately 519 nm, and the transmission spectrum of the blue filter CF_B of the color filter 300 has a wavelength with a main peak of less than approximately 460 nm. In addition, a light transmission ratio B/G of the blue filter CF_B to the green filter CF_G is less than approximately $8.4 \times 10^{-4}/1.1 \times 10^{-3}$.

Figure 5:
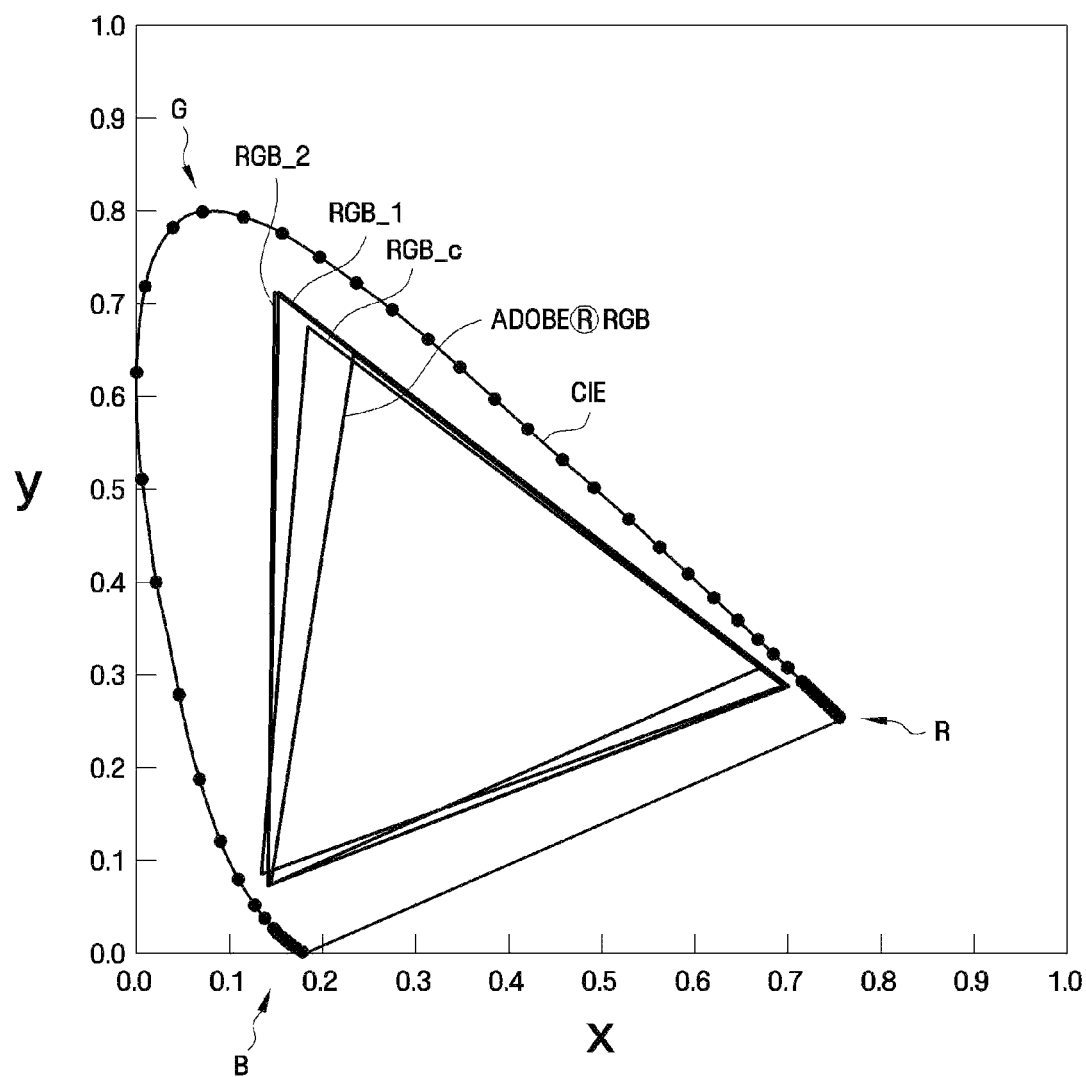
FIG. 5 is an x-y chromaticity diagram showing the color gamut of light source units included in the LCD according to the exemplary embodiment of the present invention shown in FIG. 1.

The color gamut of the light source units 150 will now be described in further detail with reference to FIG. 5. FIG. 5 is an x-y chromaticity diagram showing a color gamut of the light source units 150 included in the LCD 1 according to the exemplary embodiment of the present invention shown in FIG. 1. In FIG. 5, a color gamut of light which is emitted from the light source units 150 but has not yet passed through the color filter 300 is shown.

Table 1 shows a wavelength and a color reproducibility of light of the red light source chip LM_R, the green light source chip LM_G, and the blue light source chip LM_B included in the light source units 150 according to an exemplary embodiment of the present invention, compared to a wavelength of light from a corresponding light source chip of each color included in a light source unit from a comparative experimental sample.

TABLE 1

| | Red Light Source Chip | Green Light Source Chip | Blue Light Source Chip | Color Reproducibility |
|---|---|---|---|---|
| Comparative experimental example | 624.3 nm | 530.5 nm | 454 nm | 105.90% |
| Experimental example 1 | 624.3 nm | 530.5 nm | 447.5 nm-450 nm | 106.10% |
| Experimental example 2 | 624.3 nm | 530.5 nm | 445 nm-447.5 nm | 106.11% |

In Table 1, color reproducibility is a percentage of a ratio of a color space in each experimental example compared to a National Television System Committee ("NTSC") color space which is a standard for cathode ray tube ("CRT") monitors of the United States ("U.S."), and is based on CIE 1731.

FIG. 5 shows the color gamuts of light source units in the comparative experimental example, the experimental example 1, and the experimental sample 2. Referring to FIG. 5, each vertex of a respective color space indicates red light, green light, or blue light. A CIE color space is a color space defined by the CIE, and an ADOBE® RGB color space is a color space standard suggested by ADOBE® Systems. In addition, an RGB_c color space represents the color gamut of the comparative experimental example shown in Table 1, an RGB__1 color space represents the color gamut of the experimental example 1 shown in Table 1, and an RGB__2 color space represents the color gamut of the experimental example 2 shown in Table 1.

In the comparative experimental example, the experimental example 1, and the experimental sample 2, red light and green light satisfy an ADOBE® RGB standard, e.g., correspond to the ADOBE® RGB standard. On the other hand, blue light from the comparative experimental example deviates from the ADOBE® RGB standard, as shown in FIG. 5 and in Table 1. In the case of the experimental example 1 and the experimental sample 2, the blue light satisfies the ADOBE® RGB standard.

Figure 6:
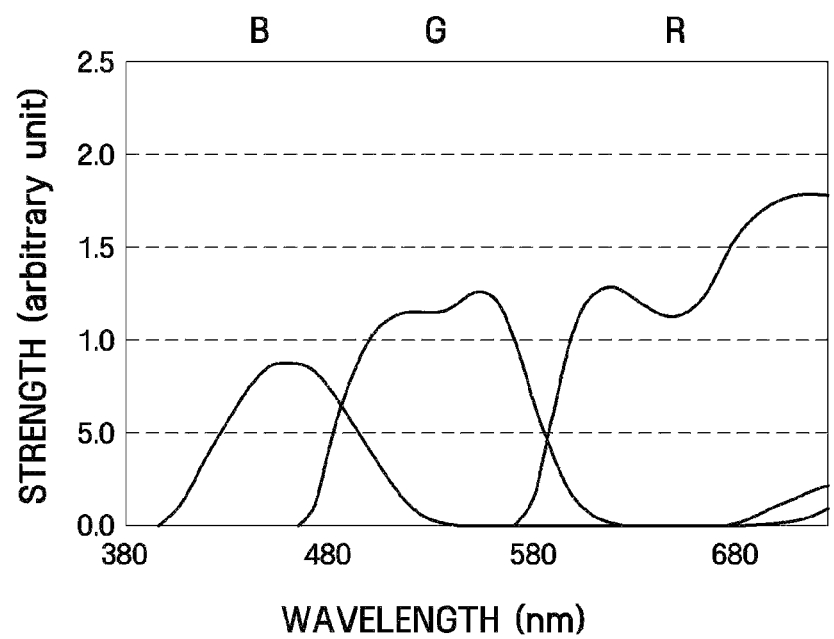
FIG. 6 is a graph of wavelength versus strength illustrating wavelength characteristics of light which passes through the color filter included in the LCD according to the exemplary embodiment of the present invention shown in FIG. 1.
Figure 7:
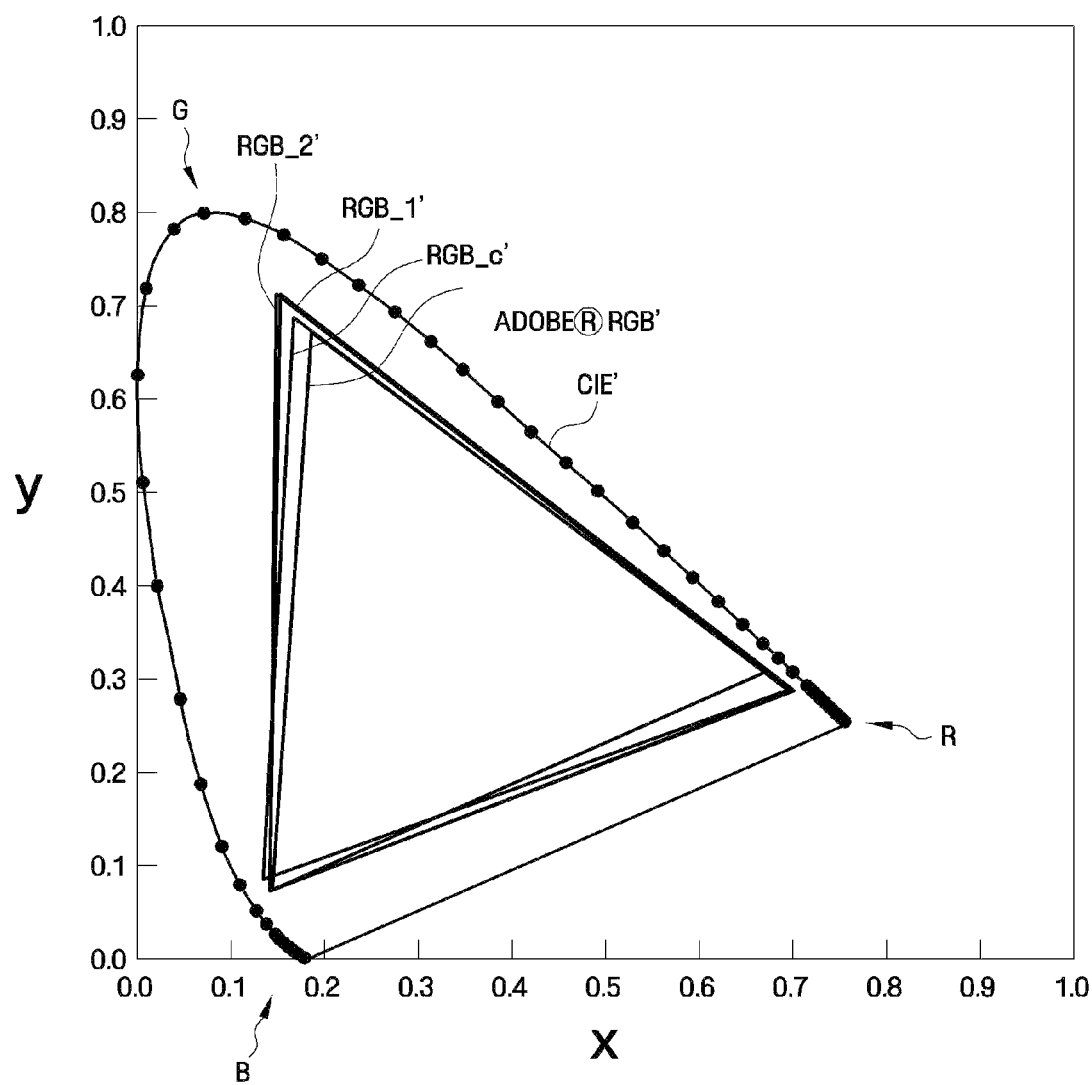
FIG. 7 is an x-y chromaticity diagram showing a color gamut of light which passes through the color filter included in the LCD according to the exemplary embodiment of the present invention shown in FIG. 1.

The color gamut of light which passes through the color filter 300 will now be described in further detail with reference to FIGS. 6 and 7. FIG. 6 is a graph of wavelength versus strength illustrating wavelength characteristics of light which passes through the color filter 300 included in the LCD 1 of FIG. 1. FIG. 7 is an x-y chromaticity diagram showing a color gamut of light which passes through the color filter 300 included in the LCD 1 according to the exemplary embodiment of the present invention shown in FIG. 1.

To expand a color gamut of light which passes through the color filter 300, a light transmission ratio of the blue filter CF_B is changed. Specifically, the light transmission ratio of the blue filter CF_B is adjusted to reduce the FWHM of the blue filter CF_B. As a result, an area in which the blue light region and the green light region overlap each other is effectively reduced, thereby substantially widening the color gamut of the light in an exemplary embodiment.

Referring to FIG. 7, a color gamut of the LCD 1 according to an exemplary embodiment substantially encompasses the entire ADOBE® RGB color space. In the case of red light and green light, however, the color gamut of the LCD 1 according to an exemplary embodiment is wider than the ADOBE® RGB color space, while blue light of the color gamut of the LCD 1 substantially matches the gamut of the ADOBE® RGB color space. In FIG. 7, a CIE' color space is a color space defined by the CIE and represents all natural colors, and an ADOBE® RGB' color space is a color space standard suggested by ADOBE SYSTEMS INCORPORATED®. In addition, an RGB_s' color space indicates a color gamut obtained after the color filter 300 according to the present embodiment is applied to the light source units 150, similar as in the comparative experimental example shown in Table 1. Likewise, an RGB__1' color space indicates a color gamut obtained after the color filter 300 according to the present embodiment is applied to the light source units 150 in the experimental example 1 shown in Table 1 and has a color reproducibility of 111.2%. In addition, an RGB__2' color space indicates a color gamut obtained after the color filter 300 according to the present embodiment is applied to the light source units in the experimental example 2 shown in Table 1 and shows a color reproducibility of approximately 111.32%. Experimental results shown in FIG. 7 were obtained at a color temperature of approximately 6500 Kelvin ("K").

Figure 8A:
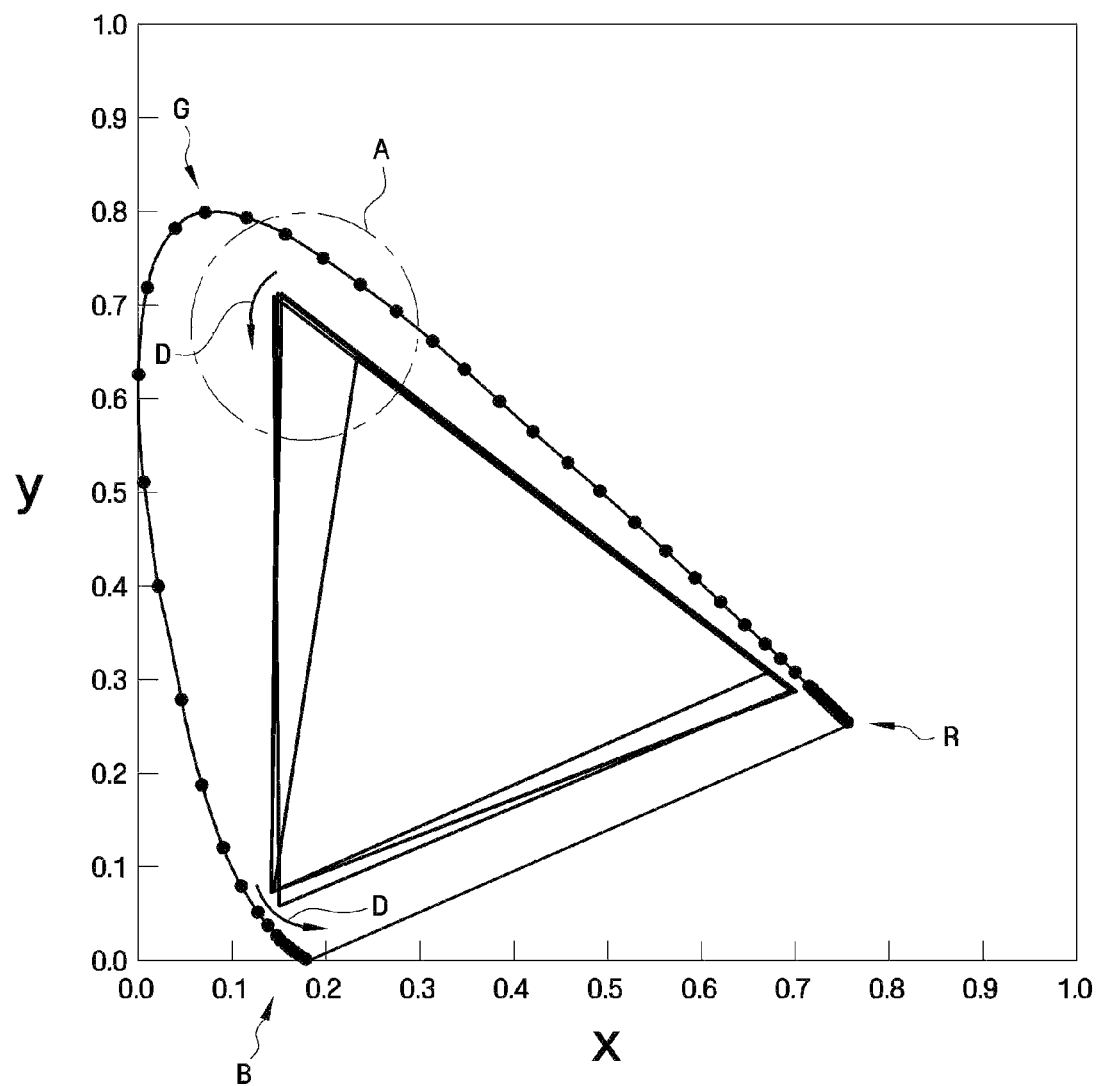
FIG. 8A is an x-y chromaticity diagram [Commission International de I'eclairage ("CIE") 1931] showing a color gamut of light source units according to an exemplary embodiment of the present invention based on changes in color temperature.
Figure 8B:
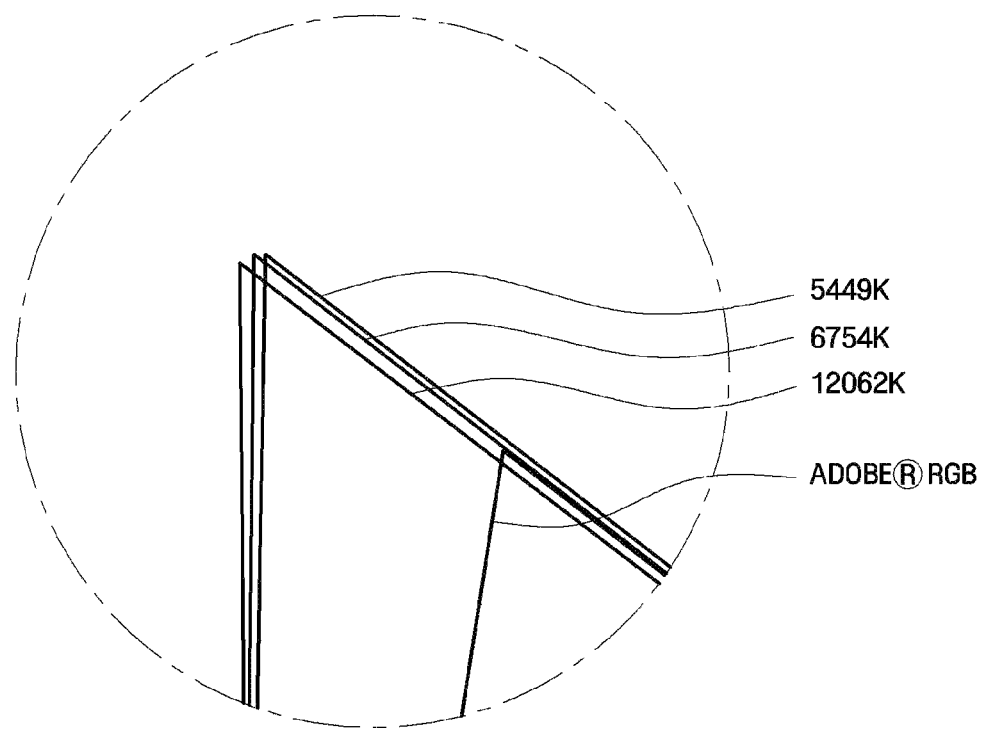
FIG. 8B is an enlarged view of a region "A" shown in FIG. 8A.
Figure 9A:
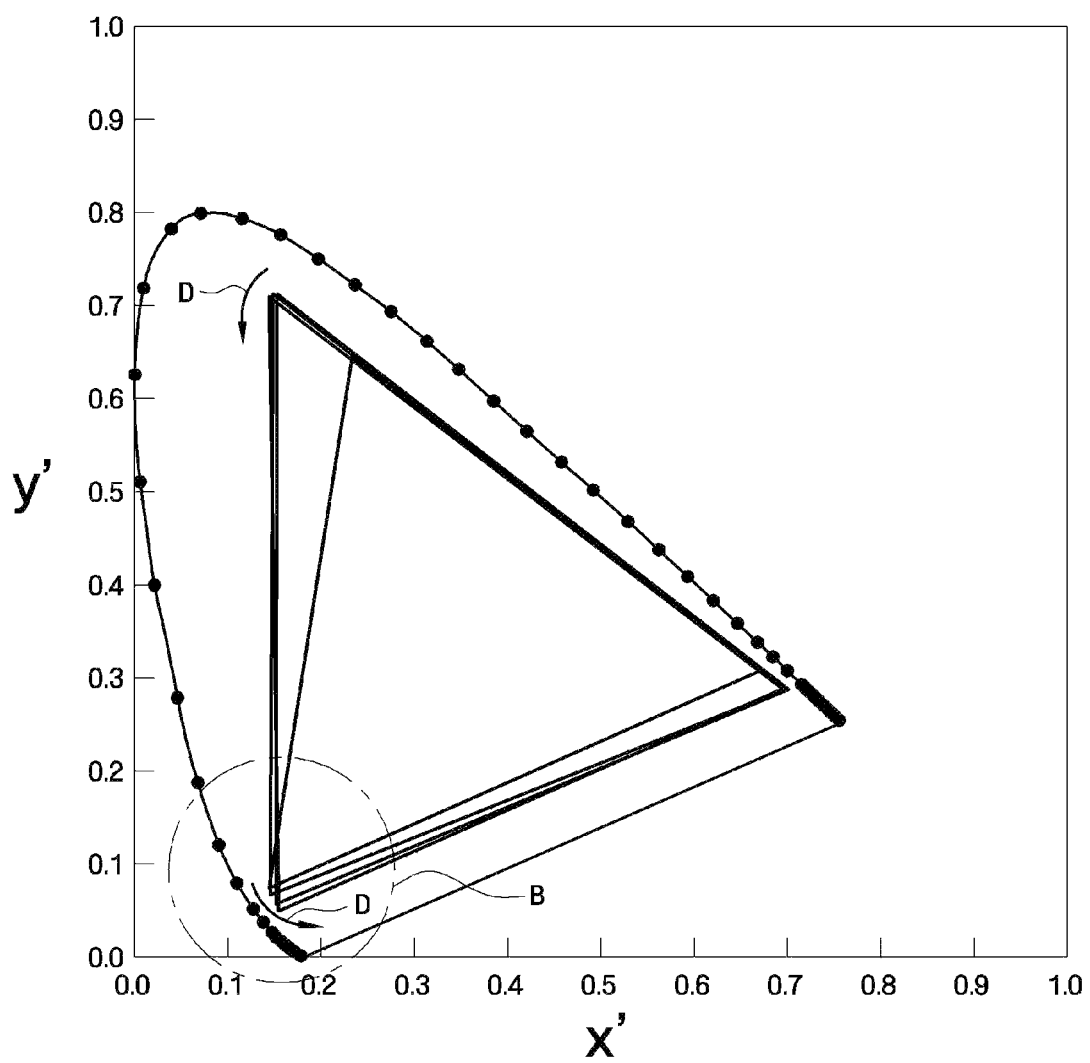
FIG. 9A is an x-y chromaticity diagram (CIE 1976) showing a color gamut of light source units according an exemplary embodiment of the present invention based on changes in color temperature.
Figure 9B:
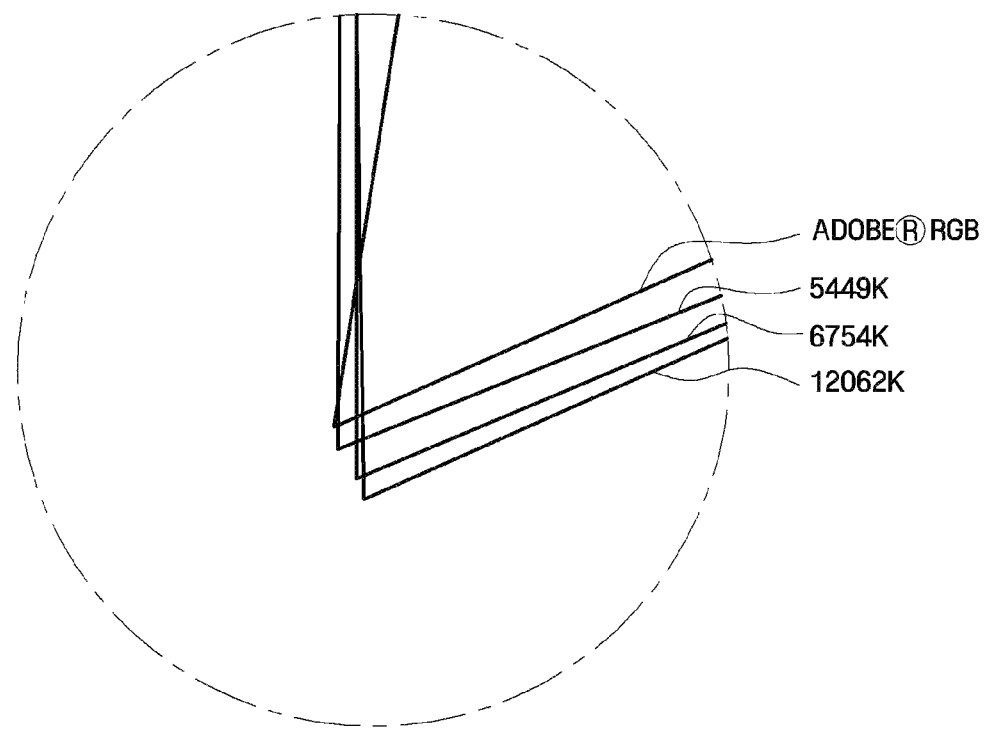
FIG. 9B is an enlarged view of a region "B" shown in FIG. 9A.

A color gamut of the light source units 150 (see FIG. 1) based on changes in color temperature will now be described in further detail with reference to FIGS. 8A through 9B. FIG. 8A is an x-y chromaticity diagram (CIE 1931) showing a color gamut of the light source units 150 according to an exemplary embodiment of the present invention based on changes in color temperature. FIG. 8B is an enlarged view of a region "A" shown in FIG. 8A. FIG. 9A is an x-y chromaticity diagram (CIE 1976) showing a color gamut of the light source units 150 according to an exemplary embodiment of the present invention based on changes in color temperature. FIG. 9B is an enlarged view of a region "B" shown in FIG. 9A.

Characteristics and/or properties of light source units 150 deteriorate over time, and properties thereof are further affected when a luminance is reduced and/or a temperature is increased. In addition, as a color temperature of light changes, the color gamut of the light source units 150 is affected.

FIGS. 8A and 9A show color gamuts of the light source units 150 according to changes in color temperature based on CIE 1931 and CIE 1976 reference coordinate systems, respectively. The color gamut of the light source units 150 according to changes in color temperature is therefore visually represented in FIGS. 8A and 9A. A blue region is emphasized in the CIE 1976 coordinate system relative to a blue region in the CIE 1931 coordinate system. Therefore, changes in blue light shown in FIG. 9A are more apparent than changes in blue light shown in FIG. 8A.

Table 2 shows color coordinates of the light source units 150 in the CIE 1976 coordinate system and the CIE 1931 coordinate system according to changes in color temperature.

TABLE 2

| Color Temperature | Coordinate System | ADOBE ® RGB Coverage (%) |
| --- | --- | --- |
| 4840 K | CIE 1931 | 99.585% |
|  | CIE 1976 | 98.021% |
| 5449 K | CIE 1931 | 99.899% |
|  | CIE 1976 | 99.007% |
| 6552 K | CIE 1931 | 99.695% |
|  | CIE 1976 | 99.866% |
| 6754 K | CIE 1931 | 99.241% |
|  | CIE 1976 | 99.440% |
| 9866 K | CIE 1931 | 97.925% |
|  | CIE 1976 | 99.172% |
| 12062 K | CIE 1931 | 97.364% |
|  | CIE 1976 | 98.9% |

As shown in Table 2, the color gamut of the light source units 150 varies according to a color temperature thereof, which in turn changes coverage of the ADOBE® RGB color space by a respective color gamut of the light source units 150. It can be seen, based upon values shown in Table 2, that an optimum color gamut of the light source units 150 is obtained when color temperature is between approximately 5,000 K and approximately 7,000 K.

Changes in color coordinates of the red light source chip LM_R, the green light source chip LM_G, and the blue light source chip LM_B according to changes in color temperature will now be described in further detail with reference to FIGS. 8A through 12B.

Figure 10A:
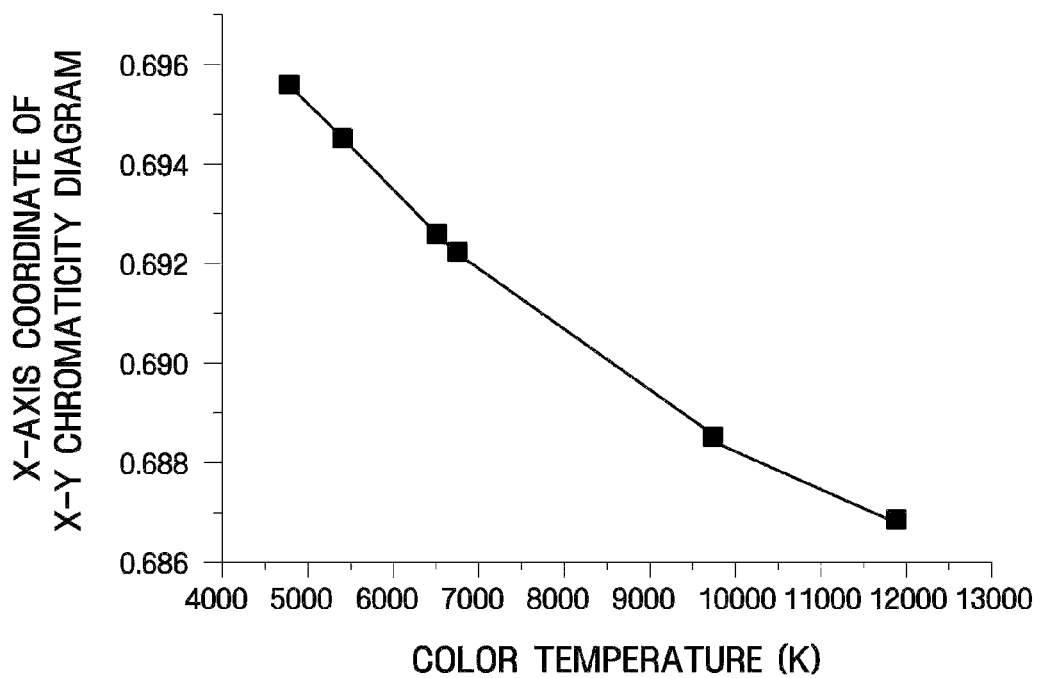
FIG. 10A is a graph of color temperature versus an x-axis coordinate illustrating a shift of color coordinates of a red light source chip according to an exemplary embodiment of the present invention based on changes in color temperature.
Figure 10B:
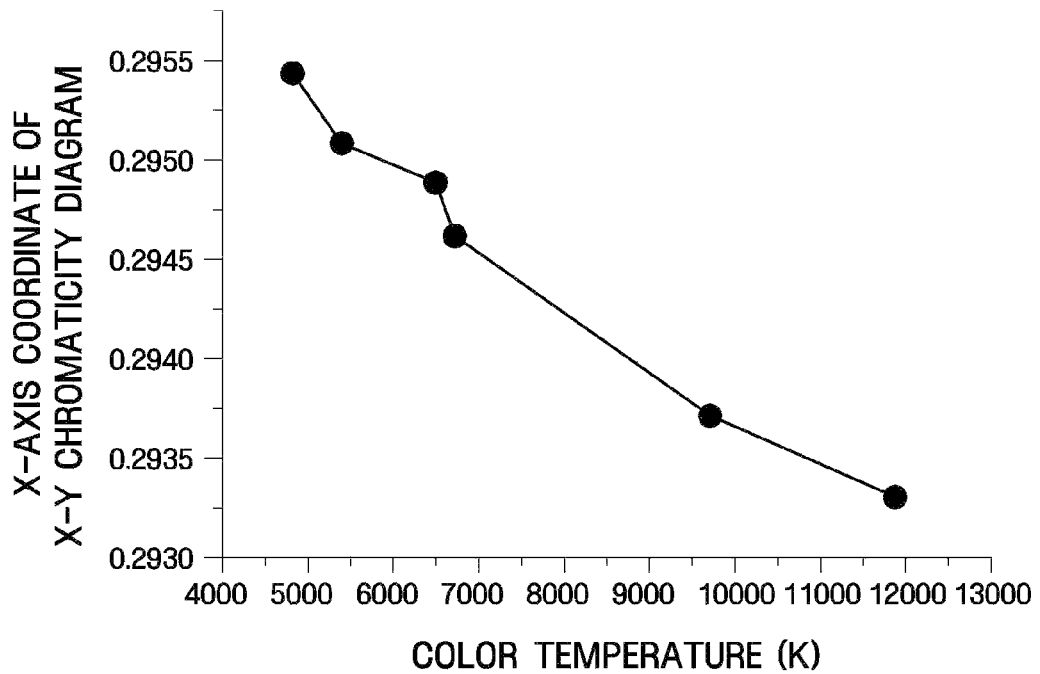
FIG. 10B is a graph of color temperature versus a y-axis coordinate illustrating a shift of color coordinates of a red light source chip according to an exemplary embodiment of the present invention based on changes in color temperature.
Figure 11A:
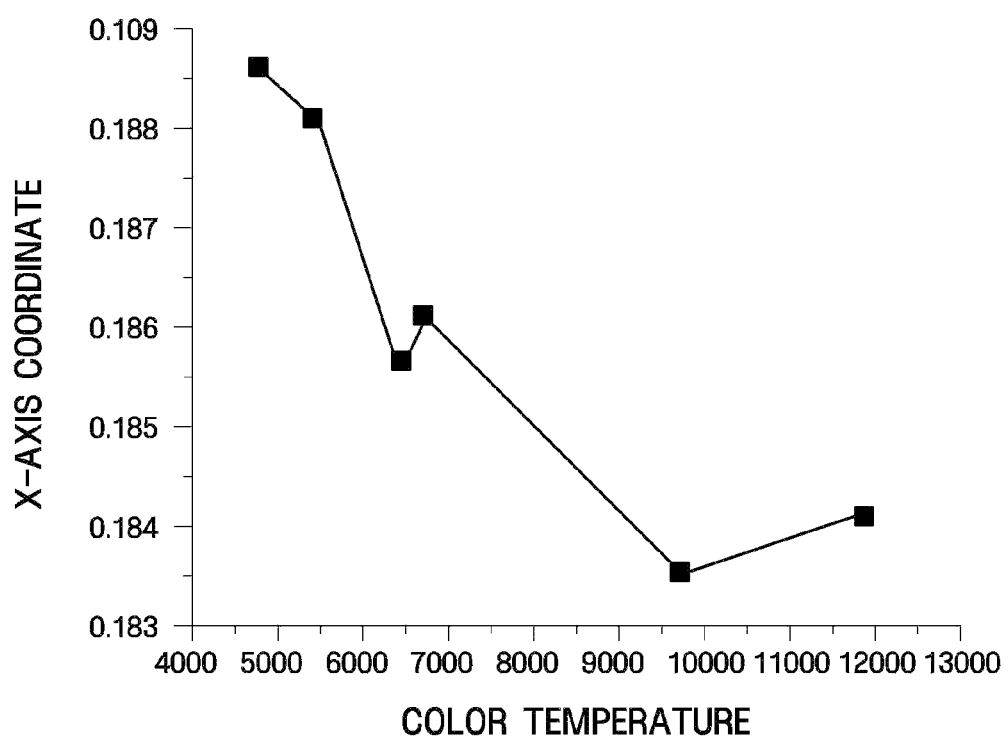
FIG. 11A is a graph of color temperature versus an x-axis coordinate illustrating a shift of color coordinates of a green light source chip according to an exemplary embodiment of the present invention based on changes in color temperature.
Figure 11B:
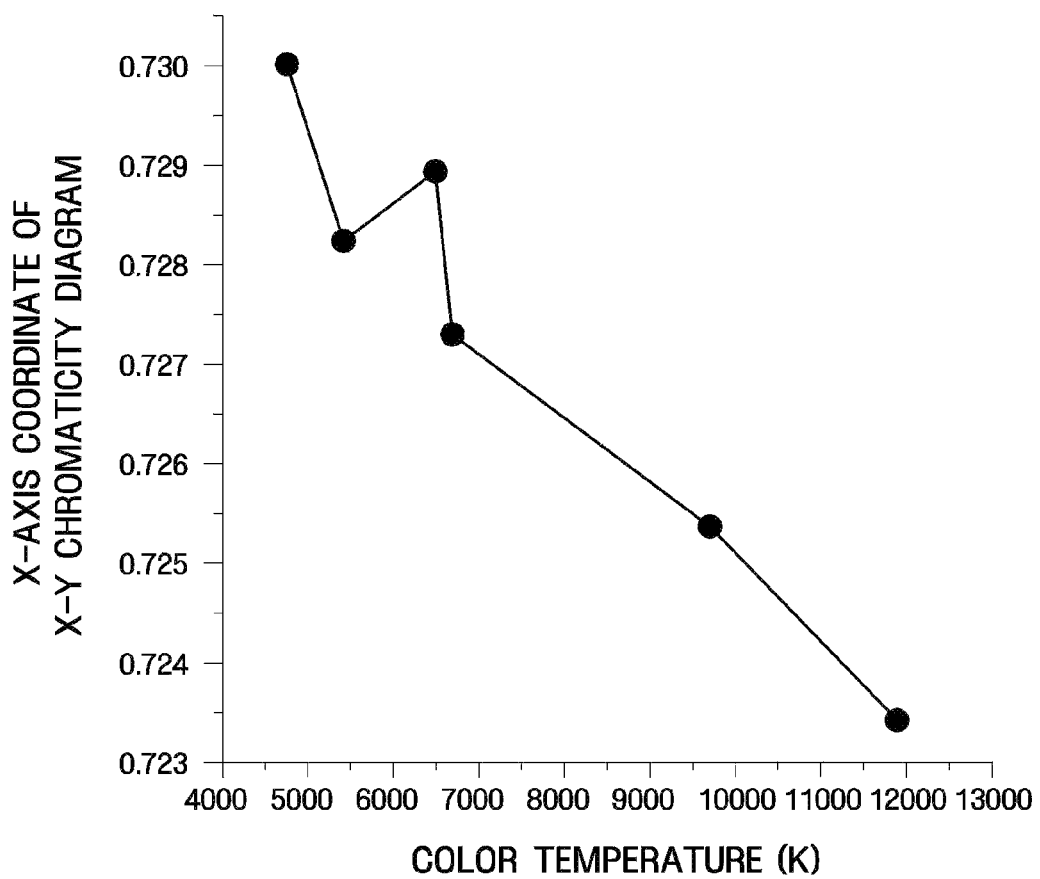
FIG. 11B is a graph of color temperature versus a y-axis coordinate illustrating a shift of color coordinates of a green light source chip according to an exemplary embodiment of the present invention based on changes in color temperature.
Figure 12A:
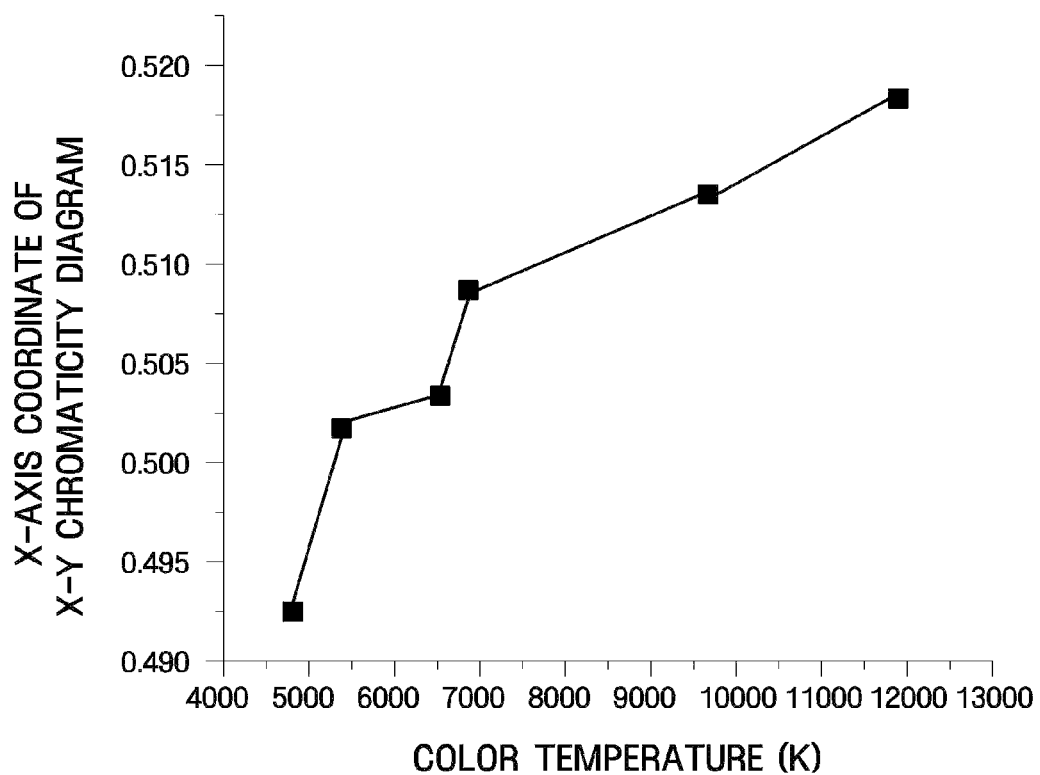
FIG. 12A is a graph of color temperature versus an x-axis coordinate illustrating a shift of color coordinates of a blue light source chip according to an exemplary embodiment of the present invention based on changes in color temperature.
Figure 12B:
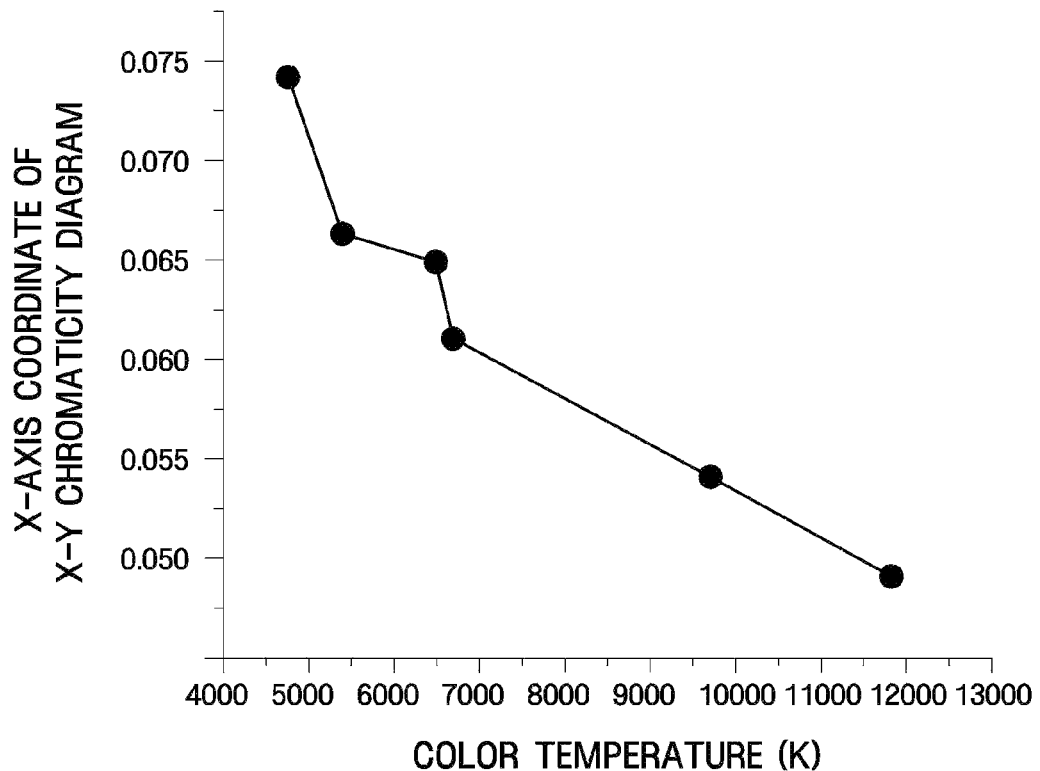
FIG. 12B is a graph of color temperature versus a y-axis coordinate illustrating a shift of color coordinates of a blue light source chip according to an exemplary embodiment of the present invention based on changes in color temperature.

FIG. 10A is a graph of color temperature versus an x-axis coordinate illustrating a shift of color coordinates of a red light source chip according to an exemplary embodiment of the present invention based on changes in color temperature, and FIG. 10B is a graph of color temperature versus a y-axis coordinate illustrating a shift of color coordinates of a red light source chip according to an exemplary embodiment of the present invention based on changes in color temperature. FIG. 11A is a graph of color temperature versus an x-axis coordinate illustrating a shift of color coordinates of a green light source chip according to an exemplary embodiment of the present invention based on changes in color temperature, and FIG. 11B is a graph of color temperature versus a y-axis coordinate illustrating a shift of color coordinates of a green light source chip according to an exemplary embodiment of the present invention based on changes in color temperature. FIG. 12A is a graph of color temperature versus an x-axis coordinate illustrating a shift of color coordinates of a blue light source chip according to an exemplary embodiment of the present invention based on changes in color temperature, and FIG. 12B is a graph of color temperature versus a y-axis coordinate illustrating a shift of color coordinates of a blue light source chip according to an exemplary embodiment of the present invention based on changes in color temperature Specifically, FIGS. 10A, 11A and 12A show a shift of x-coordinates of color coordinates of a red light, a green light, and a blue light, respectively, based on changes in color temperature, while FIGS. 10B, 11B and 12B show a shift of y-coordinates of the color coordinates of the red light, the green light, and the blue light, respectively, based on changes in color temperature.

Referring to FIGS. 8A through 10B, as color temperature increases, both the x-coordinate and the y-coordinate of the red light are reduced. As the color temperature increases, thus, a vertex of each triangle which indicates the red light R, is moved to the lower left of the triangle as viewed in FIGS. 8A and 9A. Put another way, the vertexes are rotated substantially counter-clockwise in a direction D, as shown in FIGS. 8A and 9A.

Referring to FIGS. 8A through 9B, 11A, and 11B, as color temperature increases, both the x-coordinate and the y-coordinate of the green light are reduced. That is, as the color temperature increases, a vertex of each triangle, which indicates the green light, is moved to the lower right of the triangle, e.g., vertex of each triangle is rotated in the direction D.

Likewise, as shown in FIGS. 8A through 9B, 12A and 12B, as color temperature increases, the x-coordinate of the blue light is increased while the y-coordinate thereof is reduced. Thus, as the color temperature increases, a vertex of each triangle, which indicates the blue light, is moved in the direction D, e.g., toward the lower right of the triangle.

Coordinates which correspond to each vertex of each triangle, e.g., which correspond to each of the red light, the green light, and the blue light, can be adjusted by controlling color temperature. Thus, coverage of the ADOBE® RGB color space by the color gamut of the light source units 150 can be adjusted by controlling x- and y-coordinates of a white light.

Figure 13:
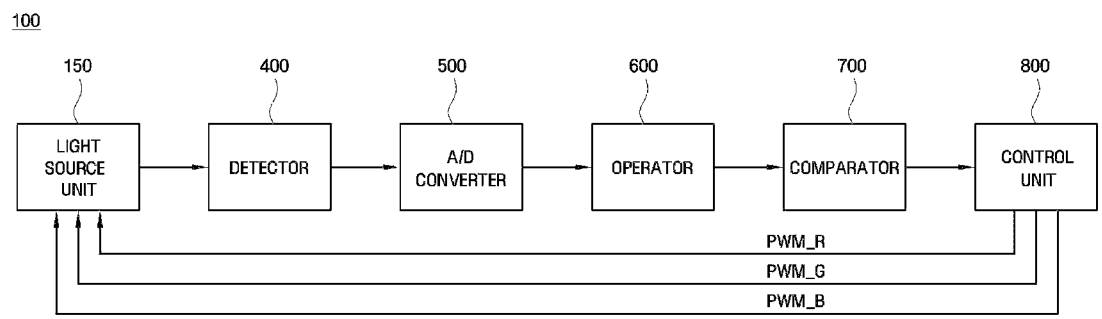
FIG. 13 is a block diagram of a light source assembly according to an exemplary embodiment of the present invention.

A light source assembly 100 according to an exemplary embodiment of the present invention will now be described in further detail with reference to FIG. 13. FIG. 13 is a block diagram of a light source assembly according to an exemplary embodiment of the present invention.

The light source assembly 100 according to an exemplary embodiment includes a light source unit 150, a detector 400, an analog-to-digital ("A/D") converter 500, an operator 600, a comparator 700, and a control unit 800. The light source unit 150 includes a red light source chip LM_R (see FIG. 2), a green light source chip LM_G (see FIG. 2), and a blue light source chip LM_B (see FIG. 2).

The detector 400 senses light emitted from the light source unit 150. The detector 400 may includes a red light sensor, a green light sensor, and a blue light sensor to sense wavelengths of red light, green light and blue light, respectively. The detector 400 detects the respective wavelengths of the red light, green light and the blue light and outputs a red light signal, a green light signal and a blue light signal which are analog signals. The red light signal, the green light signal, and the blue light signal are inputted to the A/D converter 500.

The A/D converter 500 converts the red light signal, the green light signal, and the blue light signal, which are analog signals, into a digital red light signal, a digital green light signal, and a digital blue light signal, respectively. Then, the digital red light signal, the digital green light signal, and the digital blue light signal are inputted to the operator 600.

The operator 600 calculates color coordinates of light emitted from the red light source chip LM_R (hereinafter referred to as "red light source color coordinates"), color coordinates of light emitted from the green light source chip LM_G (hereinafter referred to as "green light source color coordinates"), and color coordinates of light emitted from the blue light source chip LM_B (hereinafter referred to as "blue light source color coordinates") using the digital red light signal, the digital green light signal, and the digital blue light signal. In an exemplary embodiment, the operator 600 outputs color coordinates of a light source chip, which correspond to each light signal, using a lookup table for each light source chip, for example. The calculated red light source color coordinates, green light source color coordinates, and blue light source color coordinates are then inputted to the comparator 700.

The comparator 700 compares the red light source color coordinates, the green light source color coordinates, and the blue light source color coordinates received from the operator 600 to reference coordinates of red (hereinafter referred to as "red reference coordinates"), reference coordinates of green (hereinafter referred to as "green reference coordinates"), and reference coordinates of blue (hereinafter referred to as "blue reference coordinates"), respectively, and outputs results of the comparison to the control unit 800. The comparator 700 determines whether the red light source color coordinates, the green light source color coordinates, and the blue light source color coordinates are located in a predetermined reference region a predetermined reference color space and, if not, controls properties of each light source chip (FIG. 2) using the control unit 800. In an exemplary embodiment having an X-Y (X,Y) color coordinate system, the red reference coordinates are set to (0.64, 0.34), the green reference coordinates are set to (0.21, 0.71), and the blue reference coordinates are set to (0.15, 0.06), but alternative exemplary embodiments are not limited thereto. For example, in a U-V (U,V) color coordinate system, the red reference coordinates may be set to (0.441, 0.528), the green reference coordinates may be set to (0.076, 0.576), and the blue reference coordinates may be set to (0.175, 0.158).

The control unit 800 controls an electric current supplied to each of the red light source chip LM_R, the green light source chip LM_G, and the blue light source chip LM_B based on the comparison results received from the comparator 700. As a result, the red light source chip LM_R, the green light source chip LM_G, and the blue light source chip LM_B can alter color coordinates of red, green and blue by adjusting duty ratios of a red pulse width modulation ("PWM") signal PWM_R, a green PWM signal PWM_G, and a blue PWM signal PWM_B, respectively.

Specifically, as an electric current applied to the red light source chip LM_R increases, the red light source chip LM_R moves in a direction in which a peak wavelength increases, e.g., shifts to the right as best viewed in FIG. 4. That is, an x-coordinate in the red light source color coordinates is increased while a y-coordinate is reduced.

As an electric current applied to the green light source chip LM_G and the red light source chip LM_R increases, the green light source chip LM_G and the red light source chip LM_R move in a direction such that an initial peak wavelength is first reduced and is subsequently increased. More specifically, the green light source chip LM_G moves in a direction in which the x-coordinate is increased while the y-coordinate is reduced. In addition, the blue light source chip LM_B moves in a direction in which the x-coordinate is reduced while the y-coordinate is increased. Using theses properties of each light source chip, the control unit 800 operated as a control loop to optimally control each light source chip.

Figure 14:
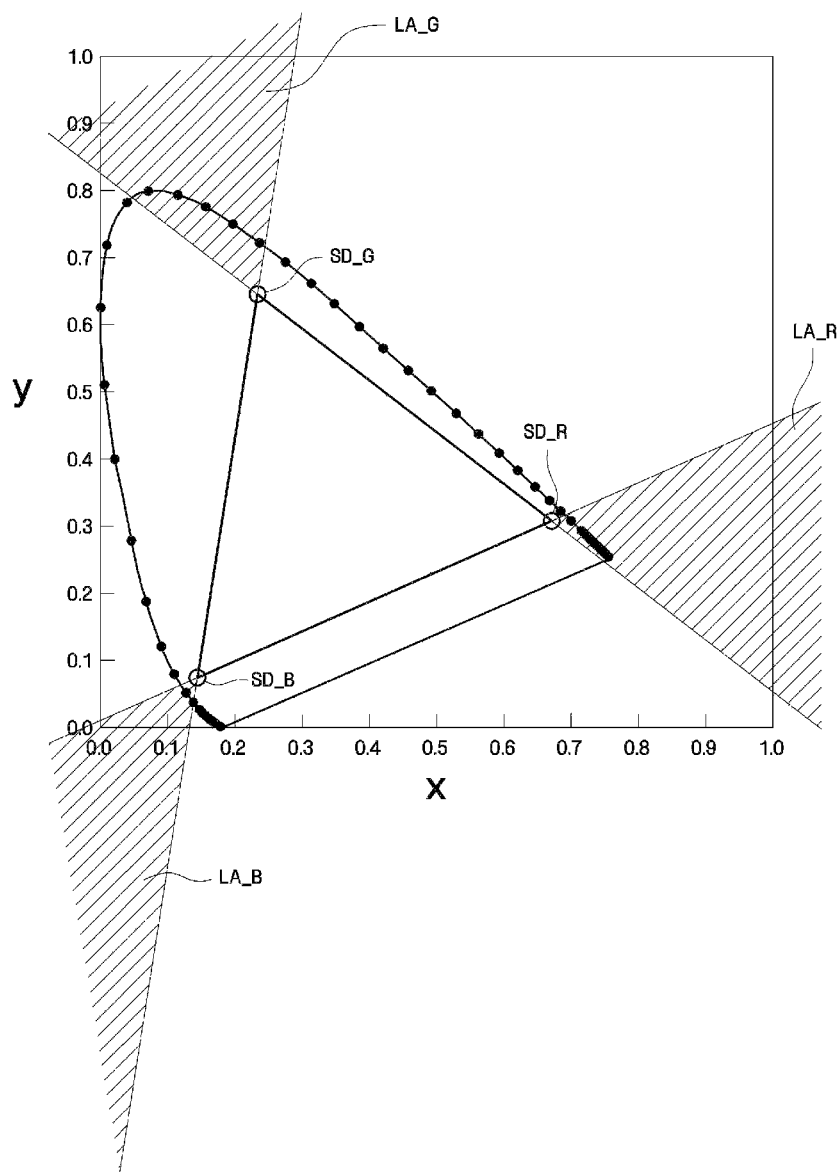
FIGS. 14 and 15 are x-y chromaticity diagrams for explaining a correction method of the light source units included in the LCD according to the exemplary embodiment of the present invention shown in FIG. 1.
Figure 15:
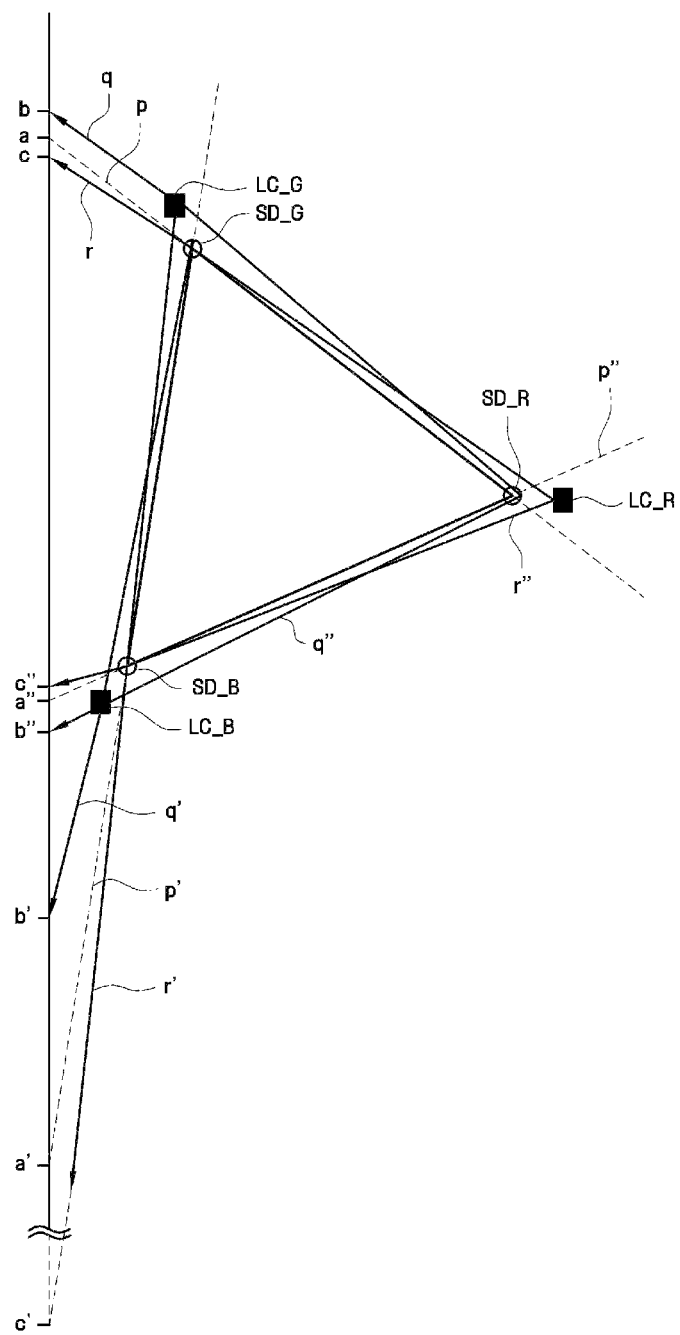

A method of correcting color coordinates of the light source units 150 (see FIG. 1) according to an exemplary embodiment of the present invention will now be described in further detail with reference to FIGS. 14 and 15. FIGS. 14 and 15 are x-y chromaticity diagrams for explaining a correction method of the light source units 150 according to an exemplary embodiment of the present invention.

Referring to FIGS. 14 and 15, red reference coordinates SD_R, green reference coordinates SD_G, and blue reference coordinates SD_B are set in a color coordinate system, and a triangle connecting the red reference coordinates SD_R, the green reference coordinates SD_G and the blue reference coordinates SD_B to each another is thereby set. The area inside the triangle is a reference color space. Thus, a color gamut of the light source units 150 must be adjusted to include the entire reference color space.

When each side of the triangle is extended, each vertex of the triangle and two lines extending from both sides of the triangle form a region located at an exterior angle of each vertex of the triangle. More specifically, a region located at an exterior angle of the red reference coordinates SD_R is referred to as a red light source region LA_R, a region located at an exterior angle of the green reference coordinates SD_G is referred to as a green light source region LA_G, and a region located at an exterior angle of the blue reference coordinates SD_B is referred to as a blue light source region LA_B, as shown in FIG. 14.

As described in greater detail above, coordinates of light emitted from the red light source chip LM_R, the green light source chip LM_G, and the blue light source chip LM_B (see FIG. 2) included in each of the light source units 150 (FIG. 1) according to an exemplary embodiment of the present invention, are referred to as red light source color coordinates LC_R, green light source color coordinates LC_G, and blue light source color coordinates LC_B, respectively.

In order for the color gamut of the light source units 150 according to an exemplary embodiment of the present embodiment to include the entire reference color space, the red light source color coordinates LC_R, the green light source coordinates LC_G, and the blue light source color coordinates LC_B must be located in the red light source region LA_R, the green light source region LA_G, the blue light source region LA_B, respectively. Put another way, the space inside the triangle having the red light source color coordinates LC_R, the green light source color coordinates LC_G, and the blue light source color coordinates LC_B as three vertexes thereof is the color gamut of the light source units 150. Thus, the red light source color coordinates LC_R, the green light source color coordinates LC_G, and the blue light source color coordinates LC_B must be controlled to be within the red light source region LA_R, the green light source region LA_G, and the blue light source region LA_B, respectively, so that the color gamut of the light source units 150 always includes the reference color space.

A specific algorithm for determining whether each color coordinates is located in a corresponding light source region will now be described in further detail.

In a color coordinate system, the red reference coordinates SD_R, the green reference coordinates SD_G, and the blue reference coordinates SD_B are set, and the red light source color coordinates LC_R, the green light source color coordinates LC_G and the blue light source color coordinates LC_B are set.

Referring to FIG. 15, an equation for a straight line connecting the red reference coordinates SD_R and the green reference coordinates SD_G is referred to as an equation of a first line p, and an equation for a straight line connecting the red reference coordinates SD_R and the green light source color coordinates LC_G is referred to as an equation of a second line q. In addition, an equation for a straight line connecting the red light source color coordinates LC_R and the green reference coordinates SD_G is referred to as an equation of a third line r.

Further, an equation for a straight line connecting the green reference coordinates SD_G and the blue reference coordinates SD_B is referred to as an equation of a fourth line p', and an equation for a straight line connecting the green reference coordinates SD_G and the blue light source color coordinates LC_B is referred to as an equation of a fifth line q'. An equation for a straight line connecting the green light source color coordinates LC_G and the blue reference coordinates SD_B is referred to as an equation of a sixth line r'.

In addition, an equation for a straight line connecting the blue reference coordinates SD_B and the red reference coordinates SD_R is referred to as an equation of a seventh line p", an equation for a straight line connecting the red reference coordinates SD_R and the blue light source color coordinates LC_B is referred to as an equation of an eighth line p'", and an equation for a straight line connecting the blue reference coordinates SD_B and the red light source color coordinates SD_R is referred to as an equation of a ninth line r".

In order for the color coordinates to be located in a corresponding light source region, a value a of the y-intercept in the equation of the first line p must be located between a value b of the y-intercept in the equation of the second line q and a value c of the y-intercept in the equation of the third line r. In addition, a value a' of the y-intercept in the equation of the fourth line p' must be located between a value b' of the y-intercept in the equation of the fifth line and a value c' of the y-intercept in the equation of the sixth line r', and a value a" of the y-intercept in the equation of the seventh line p" must be located between a value b" of the y-intercept in the equation of the eighth line q" and a value c" of the y-intercept in the equation of the ninth line r".

When a feedback control, e.g., an operation of the control unit 800 (see FIG. 13), is operated in a way which satisfies the conditions described above by comparing the value of the respective y-intercepts in the equations of the above lines, the color gamut of the light source units 150 is effectively maintained at least within the reference color space.

However, a light source chip may deteriorate over time, or changes in properties of the light source chip due to heat, for example, may exceed a predetermined level. In this case, it becomes impossible to reach an optimum level using the self-correction capability of the light source units 150 alone. More specifically, when it is not possible to meet the predetermined level by controlling the associated PWM signal transmitted to a given light source chip, a control operation using an infinite loop is terminated. Then, an allowed range of y-intercept values is set, and, when a correction value enters the allowed range, the control operation is terminated.

Properties of each light source chip, e.g., physical properties, have different properties based on a particular color of a given light source chip. Thus, a different range of y-intercept values may be set for each respective light source chip. Specifically, the red light source chip LM_R and the green light source chip LM_G may be controlled based on the red reference coordinates SD_R and the green reference coordinates SD_G, respectively, which are initially set. However, an allowed range of y-intercept values may be set for the blue light source chip LM_B. Thus, when the blue light source chip LM_B cannot be controlled based on the initially set blue reference coordinates SD_B, the control of the blue light source chip LM_B may be terminated when a correction value enters the allowed range.

For example, in an exemplary embodiment, the blue light source chip LM_B is controlled within an approximately 15 percent deviation from the value a' of the y-intercept in the equation of the fourth line p' or the value a" of the y-intercept in the equation of the seventh line p". Specifically, if the value a' of the y-intercept in the equation of the fourth line p' or the value a" of the y-intercept in the equation of the seventh line p" is m, for example, an allowed range p of y-intercept values may be set to $m - m \times 0.15 \leq p \leq m + m \times 0.15$. As a result, when they-intercept of the equation of the ninth line r" and the y-intercept of the equation of the fifth line q' are within the allowed range p, the loop may be terminated. In an exemplary embodiment, a value of the allowed range is varied according to conditions of each individual light source chip.

According to exemplary embodiments of the present invention as described herein, a light source assembly, an LCD having the light source assembly, and a method of driving the light source assembly provide at least the advantage of a reproducible color space substantially expanded to represent colors which more accurately represent natural colors.

The present invention should not be construed as being limited to the exemplary embodiments set forth herein. Rather, these exemplary embodiments are provided so that this disclosure will be thorough and complete and will fully convey the concept of the present invention to those skilled in the art.

While the present invention has been particularly shown and described with reference to exemplary embodiments thereof, the exemplary embodiments should be considered in a descriptive sense only and not for purposes of limitation. Further, it will be understood by those of ordinary skill in the art that various changes in form and details may be made therein without departing from the spirit or scope of the present invention as defined by the following claims.

What is claimed is:

1. A light source assembly comprising:
   a light source assembly which emits light and comprises a red light source which emits red light, a green light source which emits green light and a blue light source which emits blue light,
   a detector which detects the light and generates a light signal based on a property of the light;
   an operator operably connected to the detector and which receives the light signal and calculates a color coordinate of the light source based on the light signal;
 a comparator operably connected to the operator and which compares the color coordinate of the light source to a predetermined reference color coordinate; and
   a control unit operably connected to the comparator and which controls separately pulse width modulation signals transmitted to the red light source, the green light source, and the red light source based on a result of the comparison of the comparator; wherein the comparator
   derives an equation of a first straight line which passes through a reference coordinate of a first color and a reference coordinate of a second color,
   derives an equation of a second straight line which passes through the reference coordinate of the first color and a color coordinate of a second color light source,
   derives an equation of a third straight line which passes through a color coordinate of a first color light source and the reference coordinate of the second color, and
   determines whether a y-intercept of the equation of the first straight line is located between a y-intercept of the equation of the second straight line and a y-intercept of the equation of the third straight line.

2. The assembly of claim 1, wherein
the predetermined reference color coordinate comprises a reference coordinate of a first color, a reference coordinate of a second color and a reference coordinate of a third color,
the color coordinate of the light source comprises at least one of a color coordinate of a first color light source, a color coordinate of a second color light source and a color coordinate of a third color light source, and
the comparator determines whether the at least one of the color coordinate of the first color light source, the color coordinate of the second color light source and the color coordinate of the third color light source are located in a first light source region of an x-y chromaticity curve, a second light source region of the x-y chromaticity curve and a third light source region of the x-y chromaticity curve, respectively, each of the first light source region, the second light source region and the third light source region being formed between corresponding vertexes of a triangle formed by the x-y chromaticity curve and lines formed by extensions of sides of the triangle which form a corresponding vertex, wherein the corresponding vertexes of the triangle correspond to the reference coordinate of the first color, the reference coordinate of the second color and the reference coordinate of the third color.

3. The assembly of claim 2, wherein the control unit controls the pulse width modulation signal such that the color coordinate of the first color light source, the color coordinate of the second color light source and the color coordinate of the third color light source are located in the first light source region, the second light source region and the third light source region, respectively.

4. The assembly of claim 2, wherein the reference coordinate of the first color, the reference coordinate of the second color and the reference coordinate of the third color are a reference coordinate of red, a reference coordinate of green and a reference coordinate of blue, respectively, and the color coordinate of the first color light source, the color coordinate of the second color light source and the color coordinate of the third color light source are a color coordinate of a red light source, a color coordinate of a green light source and a color coordinate of a blue light source, respectively.

5. The assembly of claim 1, wherein the control unit controls the pulse width modulation signal such that the y-intercept of the equation of the first straight line is located between the y-intercept of the equation of the second straight line and the y-intercept of the equation of the third straight line.

6. The assembly of claim 1, wherein the control unit controls the pulse width modulation signal such that one of a value of the y-intercept of the equation of the second straight line and a value of the y-intercept of the equation of the third straight line are within an allowed range of y-intercept values.

7. The assembly of claim 6, wherein the allowed range of y-intercept values is from approximately 95 percent to approximately 115 percent of a value of the y-intercept of the equation of the first straight line.

8. The assembly of claim 1, wherein the control unit adjusts a duty ratio of the pulse width modulation signal based on the result of the comparison of the comparator to optimize the color coordinate of the light source.

9. The assembly of claim 1, wherein the light source comprises a light-emitting diode.

10. The assembly of claim 1, wherein the light source comprises a laser light source which emits a red light, a green light and a blue light.

11. A liquid crystal display comprising:
a color filter which comprises:
a red filter;
a green filter; and
a blue filter;
a light source assembly disposed on the color filter and which comprises:
a red light source which emits red light having a wavelength with a main peak in a range of approximately 620 nm to approximately 630 nm and a spectrum having a full width at half maximum of less than approximately 15 nm;
a green light source which emits green light having a wavelength with a main peak in a range of approximately 525 nm to approximately 535 nm and a spectrum with a full width at half maximum of less than approximately 30 nm; and
a blue light source which emits blue light having a wavelength with a main peak in a range of approximately 445 nm to approximately 455 nm and a spectrum with a full width at half maximum of less than approximately 19 nm, wherein
the light source assembly mixes the red light, the green light and the blue light to generate white light and outputs the white light to the color filter; and
a light source which emits light;
a detector which detects the light and generates a light signal;
an operator operably connected to the detector and which receives the light signal and calculates a color coordinate of the light source based on the light signal;
a comparator operably connected to the operator and which compares the color coordinate of the light source to a predetermined reference color coordinate; and
a control unit operably connected to the operator and which controls a pulse width modulation signal transmitted to the light source based on a result of the comparison of the comparator,
wherein the comparator derives an equation of a first straight line which passes through a reference coordinate of a first color and a reference coordinate of a second color, derives an equation of a second straight line which passes through the reference coordinate of the first color and a color coordinate of a second color light source, derives an equation of a third straight line which passes through a color coordinate of a first color light source and the reference coordinate of the second color, and determines whether a y-intercept of the equation of the first straight line is located between a y-intercept of the equation of the second straight line and a y-intercept of the equation of the third straight line.

12. The liquid crystal display of claim 11, wherein a transmission spectrum of the green filter has a main peak in a range of approximately 515 nm to approximately 519 nm.

13. The liquid crystal display of claim 11, wherein a light transmission ratio of the blue filter to the green filter is less than approximately $8.4 \times 10^{-4}/1.1 \times 10^{-3}$.

14. The liquid crystal display of claim 11, wherein a color temperature of the white light is in a range of approximately 5000 K to approximately 7000 K.

15. The liquid crystal display of claim 11, wherein the light source assembly further comprises:
a light source which emits light;
a detector which detects the light and generates a light signal;

an operator operably connected to the detector and which receives the light signal and calculates a color coordinate of the light source based on the light signal;

a comparator operably connected to the operator and which compares the color coordinate of the light source to a predetermined reference color coordinate; and a control unit operably connected to the operator and which controls a pulse width modulation signal transmitted to the light source based on a result of the comparison of the comparator.

16. A method of driving a light source assembly comprising a red light source emitting red light, a green light source emitting green light and a blue light source emitting blue light, the method comprising:

detecting light emitted from the light source with a detector and generating a light signal based on a property of the light with the detector;

receiving the light signal with an operator and calculating a color coordinate of the light source with the operator;

comparing the color coordinate of the light source to a predetermined reference color coordinate using a comparator, wherein the comparing the color coordinate of the light source to the predetermined reference color coordinate comprises deriving an equation of a first straight line which passes through a reference coordinate of a first color and a reference coordinate of a second color;

deriving an equation of a second straight line which passes through the reference coordinate of the first color and a color coordinate of a second color light source;

deriving an equation of a third straight line which passes through a color coordinate of a first color light source and the reference coordinate of the second color; and determining whether a y-intercept of the equation of the first straight line is located between a y-intercept of the equation of the second straight line and a y-intercept of the equation of the third straight line; and controlling separately pulse width modulation signals transmitted to the red light source, the green light source and the blue light source with a controller based on the comparison result.

17. The method of claim 16, wherein the predetermined reference color coordinate comprises a reference coordinate of a first color, a reference coordinate of a second color and a reference coordinate of a third color, the color coordinate of the light source comprises a color coordinate of a first color light source, a color coordinate of a second color light source and a color coordinate of a third color light source, and the comparing the color coordinate of the light source to the predetermined reference color coordinate comprises determining whether the color coordinate of the first color light source, the color coordinate of the second color light source and the color coordinate of the third color light source are located in a first light source region of an x-y chromaticity curve, a second light source region of the x-y chromaticity curve and a third light source region of the x-y chromaticity curve, respectively, each of the first light source region, the second light source region and the third light source region being formed between corresponding vertexes of a triangle formed by the x-y chromaticity curve and lines formed by extensions of sides of the triangle which form a corresponding vertex, wherein the corresponding vertexes of the triangle correspond to the reference coordinate of the first color, the reference coordinate of the second color and the reference coordinate of the third color.

18. The method of claim 17, wherein the controlling the pulse width modulation signal comprises controlling the pulse width modulation signal such that the color coordinate of the first color light source, the color coordinate of the second color light source and the color coordinate of the third color light source are located in the first light source region, the second light source region and the third light source region, respectively.

19. The method of claim 17, wherein the reference coordinate of the first color, the reference coordinate of the second color and the reference coordinate of the third color are a reference coordinate of red, a reference coordinate of green and a reference coordinate of blue, respectively, and the color coordinate of the first color light source, the color coordinate of the second color light source and the color coordinate of the third color light source are a color coordinate of a red light source, a color coordinate of a green light source and a color coordinate of a blue light source, respectively.

20. The method of claim 16, wherein, the controlling the pulse width modulation signal comprises controlling the PWM signal such that the y-intercept of the equation of the first straight line is located between the y-intercept of the equation of the second straight line and the y-intercept of the equation of the third straight line.

21. The method of claim 16, wherein, the controlling the pulse width modulation signal comprises controlling the PWM signal such that one of a value of the y-intercept of the equation of the second straight line and a value of the y-intercept of the equation of the third straight line are within an allowed range of y-intercept values.

22. The method of claim 21, wherein the allowed range of y-intercept values is from approximately 95 percent to approximately 115 percent of a value of the y-intercept of the equation of the first straight line.

* * * * *